US006918038B1

(12) United States Patent
Smith et al.

(10) Patent No.: US 6,918,038 B1
(45) Date of Patent: Jul. 12, 2005

(54) SYSTEM AND METHOD FOR INSTALLING AN AUDITABLE SECURE NETWORK

(75) Inventors: Benjamin Hewitt Smith, NY, NY (US); Fred Hewitt Smith, Belmont, MA (US)

(73) Assignee: Angel Secure Networks, Inc., Belmont, MA (US)

( * ) Notice: Subject to any disclaimer, the term of this patent is extended or adjusted under 35 U.S.C. 154(b) by 0 days.

(21) Appl. No.: 09/441,403

(22) Filed: Nov. 16, 1999

Related U.S. Application Data

(63) Continuation-in-part of application No. 08/689,767, filed on Aug. 13, 1996, now Pat. No. 6,067,582.
(60) Provisional application No. 60/121,959, filed on Feb. 25, 1999, provisional application No. 60/108,868, filed on Nov. 18, 1998, and provisional application No. 60/108,566, filed on Nov. 16, 1998.

(51) Int. Cl.$^7$ .................................................. H04L 9/32
(52) U.S. Cl. ...................... 713/200; 709/223; 713/100
(58) Field of Search ........................ 709/203, 217–225, 709/229; 713/100, 200; 717/176–178

(56) References Cited

U.S. PATENT DOCUMENTS

| | | | |
|---|---|---|---|
| 4,408,203 A | 10/1983 | Campbell | |
| 4,658,093 A | 4/1987 | Hellman | |
| 4,696,003 A | 9/1987 | Kerr et al. | |
| 4,731,880 A | 3/1988 | Ault et al. | |
| 4,962,498 A | 10/1990 | May, Jr. | |
| 4,999,806 A | 3/1991 | Chernow et al. | |
| 5,001,755 A | 3/1991 | Skret | |
| 5,005,122 A | 4/1991 | Griffin et al. | |
| 5,023,907 A | 6/1991 | Johnson et al. | |
| 5,155,847 A | 10/1992 | Kirouac et al. | |

(Continued)

FOREIGN PATENT DOCUMENTS

| | | |
|---|---|---|
| EP | 0 703 531 A1 | 3/1996 |
| EP | 0 778 512 A2 | 6/1997 |

OTHER PUBLICATIONS

Schneier, Applied Cryptography, 1996, 2nd Edition, pp. 1–5 and 173.*

(Continued)

*Primary Examiner*—Kim Vu
*Assistant Examiner*—Paula Klimach
(74) *Attorney, Agent, or Firm*—McDermott Will & Emery LLP

(57) ABSTRACT

A system and method for generating and remotely installing a private secure and auditable network is provided. Node identification, link, and application information is input into a template. A generator generates components using the information in the template and the components are remotely installed using an installation server. The components include agent modules which are each installed at predetermined target site and establish communication with the installation server to facilitate the download of other components, including application software and configuration files. Each node can only be installed once and is specific to a predetermined target site. For each link, a unique pair of keys is generated in a form which is not human readable, each key corresponds to a different direction of communication over the link. Data transmitted between nodes is encrypted using public-private key pairs. At least one monitor node manages the security of the network, strobes keys, and may take nodes out of the network in the event of a security violation. In such a case, one or more nodes, or the entire network, may be regenerated and installed anew. Throughout the generation and installation a plurality of verifications, authorizations, and password entries may be required by independent groups to arrive at the network. Preferably, the installation is audited by several groups, and the overall operation may be audited by a second monitor node to detect the presence of an interposed "pirate" node.

58 Claims, 28 Drawing Sheets

U.S. PATENT DOCUMENTS

| | | |
|---|---|---|
| 5,247,683 A | 9/1993 | Holmes et al. |
| 5,301,247 A | 4/1994 | Rasmussen et al. |
| 5,317,744 A | 5/1994 | Harwell et al. |
| 5,388,211 A | 2/1995 | Hornbuckle |
| 5,416,842 A | 5/1995 | Aziz |
| 5,421,009 A | 5/1995 | Platt |
| 5,438,508 A | 8/1995 | Wyman |
| 5,452,415 A | 9/1995 | Hotka |
| 5,495,610 A | 2/1996 | Shing et al. |
| 5,509,070 A | 4/1996 | Schull |
| 5,509,074 A | 4/1996 | Choudhury et al. |
| 5,548,649 A | 8/1996 | Jacobson |
| 5,594,866 A | 1/1997 | Nugent |
| 5,638,512 A | 6/1997 | Osman et al. |
| 5,671,279 A | 9/1997 | Elgamal |
| 5,706,507 A | 1/1998 | Schloss |
| 5,708,709 A | 1/1998 | Rose |
| 5,708,780 A | 1/1998 | Levergood |
| 5,710,883 A | 1/1998 | Hong et al. |
| 5,732,275 A | 3/1998 | Kullick |
| 5,737,706 A | 4/1998 | Seazholtz et al. |
| 5,748,896 A | 5/1998 | Daly et al. |
| 5,826,014 A | 10/1998 | Coley et al. |
| 5,864,747 A | 1/1999 | Clark et al. |
| 5,909,589 A | 6/1999 | Parker et al. |
| 5,974,250 A | 10/1999 | Angelo et al. |
| 6,098,098 A * | 8/2000 | Sandahl et al. ............. 709/221 |
| 6,298,445 B1 * | 10/2001 | Shostack et al. ............ 713/201 |
| 6,523,166 B1 * | 2/2003 | Mishra et al. .............. 717/174 |

OTHER PUBLICATIONS

Udo Flohr, Electric Money, Jun. 1996, BYTE, pp. 74–84.

Ellen Messmer, Start–up puts security SOCKS on Windows apps, May 20, 1996, Network World, p. 39.

Ellen Messmer, Edify Software to Let Banks Open Doors Online, May 20, 1996, Network World, p. 16.

Joanie Wexler, AT&T Sells Insurers on the Web, May 20, 1996, Network World, p. 27.

Set Tool Kit for Secure Commerce, Bank Systmes +Technology, May 1996, p. 16.

Margie Semilof, Boosting Web Business, Communications Week, May 20, 1996, Section: News Brief, p. 31.

Martin Marshall, Banking on the Internet, Communications Week, May 20, 1996, p. 1.

Software Taps Net for Supply Data Sharing, Electronic Buyers News, Apr. 22, 1996, Section: Purchasing, p. 50.

Kim S. Nash and Lisa Picarille, Vendors Deliver IS–specific Apps Over the 'Net', Computer World, May 6, 1996, Section: News, p. 16.

Jan Ozer, Online Software Stores, PC Magazine, May 28, 1996, Section: Trends, p. 36.

Sebastian Rupley, Digital Bucks? Stop Here, PC Magazine, May 28, 1996, Section: First Looks, p. 54.

Karen Rodriguez, Pushing the Envelope, Communications Week, May 31, 1996, Section:Internet/Internet, p. 37.

Diane Trommer, ECS Catalog Merges EDI/Net Platforms, Electronic Buyers News, May 20, 1996, Section: Purchasing, p. 54.

Carol Sliwa, Netscape Unveils New 'New Commerce Offerings', Networld World, May 13, 1996, Section: Internet News, p. 10.

One Click Software Via the Web, DATAMATION, May 1, 1995, p. 16.

Chris Jones, Licensing Plan Flows from Stream, INFOWORLD, May 6, 1996, Section: News.

Stream International Inc., Stream, LitleNet, BBN, and KPMG Announce Industry–Wide Initiative to Enable Wide–Scale Software Electronic Commerce, May 12, 1996, http://www.stream.com.

Daniel J. Bernstein, Let's Talk: Interapplication Communications in C++ Using X Properties, Jan.–Feb. 1996, The X Journal, pp. 37–44.

C. Anthony DellaFera et al., The Zephyr Notification Service, Usenix Winter Conference, Feb. 9–12, 1988.

Adam Bryant, Am I Bid Six? Click to Bid Six!, The New York Times, May 13, 1996, Section D1.

Daniel Nachbar, When Network File Systems Aren't Enough: Automatic Software Distribution Revisited, Summer 1986, USENIX Tech. Conf., pp. 159–171.

David M. Arnow, DP: A Library for Building Portable, Reliable Distributed Applications Jan. 16–20, 1995 USENIX Tech. Conf, pp. 235–247.

Thomas Eirich, Beam: A Tool for Flexible Software Update, Sep. 19–23, 1994, USENIX Tech Conf, pp. 75–82.

Chris Maeda and Brian N. Bershad, Service without Servers, Aug. 1, 1993, IEEE, 4th IEEE Workshop on Workstation Operating Systems, pp. 170–176.

Michel Dagenais, Stephane Boucher, Robert Gerin–Lajoie, Pierre Laplante, Pierre Mailhot, LUDE: A Distributed Software Library, Nov. 1–5, 1993, USENIX Tech Conf, pp. 25–32.

Walter C. Wong, Local Disk Depot–Customizing the Software Environment, Nov. 1–5, 1993, USENIX Tech Conf, pp. 51–55.

Steven W. Lodin, The Corporate Software Bank, Nov. 1–5, 1993, USENIX Tech Conf, pp. 33–42.

Murray Turnoff and Sanjit Chinai, An Electronic Information Marketplace, 1985, North Holland Computer Networks and ISDN Systems 9, pp. 79–90.

Ken Yamada and Barbara Darrow, Electronic Distribution Program on Tap, Apr. 29, 1996, Computer Reseller News, pp, 1 and 169.

Michael Baentsch, Georg Molter and Peter Sturm, WebMake: Integrating Distributed Software Development in a Structure–enhanced Web, 1995, Computer Networks and ISDN Systems 27, pp. 789–800.

Brian D. Noble, Morgan Price and M. Satyanarayanan, A Programming Interface for Application–Aware Adaptation in Mobile Computing, Fall 1995, USENIX Association, vol. 8, No. 4, pp. 345–363.

Michael B. Jones, Interposition Agents: Transparently Interposing User Code at the System Interface, 1993, 14th ACM Symposium on Operating Systems Principles, pp. 80–93.

Diane Trommer, GE/Netscape Form Software Venture, Electronic Buyers News, Apr. 22, 1996, Section: Online @EBN, p. 54.

Ellen Messmer, Active X Pioneer Pushes Commerce, Network World, May 6, 1996, p 33.

Takahata M. et al., Real–Time Video–On–Demand System based on Distributed Servers and An Agent–Oriented Application, vol. 2663, Jan. 31, 1996, pp. 242–251.

Tim Clark, The Big Sell, Software Online, Apr. 22, 1996, Inter@ctive Week, pp. 31–35.

Chii–Ren Tsai et al., Distributed Audit with Secure Remote Procedure Calls, Oct. 1991, pp. 154–160, XP000300426.

* cited by examiner

Order form
bank_one network
1450

Network Nodes

1 monitor
2 daemon
3 distributor
4 monitor
5 damon
6 distributor

Network Links

1 monitor–2 daemon
1 monitor–3 distributor
2 daemon–6 distributor
3 distributor–5 event
3 distributor–main frame
4 monitor–5 daemon
4 monitor–6 distributor
5 daemon–trading system
6 distributor–trading system

SYSTEM AND METHOD FOR INSTALLING AN AUDITABLE SECURE NETWORK

RELATED APPLICATIONS

This application is a continuation-in-part of U.S. patent application Ser. No. 08/689,767, entitled SYSTEM AND METHOD FOR DISTRIBUTING SOFTWARE OVER A NETWORK, filed Aug. 13, 1996 now U.S. Pat. No. 6,067,582, both incorporated herein by reference. This application claims the benefit of priority from U.S. Provisional Application No. 60/108,566, filed Nov. 16, 1998; U.S. Provisional Application 60/108,868, filed Nov. 18,1998; and U.S. Provisional Application 60/121,959, filed Feb. 25, 1999, each of which is incorporated herein by reference.

BACKGROUND

The invention relates to a system and method for distributing software over a network. More particularly, the invention relates to a method for controlling software distribution by embedding a sub-component of the distribution control software in each software application, and having a central monitoring software for monitoring the distribution of the software applications.

Digitally encoded information, or software, is one of the most economically important commodities of the era The ease and economy with which perfect copies can be made and distributed has promoted the spread of software and related technologies through traditional commercial channels such as retail and mail-order sales. More recently, non-traditional distribution channels such as distribution over networks of interconnected computers such as the Internet have become more viable. These non-traditional distribution channels have made it difficult for software creators and copyright holders to regulate the use of their creations or to receive payment and registration information from their users. Consequently, software producers forfeit substantial revenues and valuable information about their customer base and potential markets.

Various security methods have been employed in an attempt to inhibit illegal copying of software. Such attempts have included software security, such as password protection and requiring original diskettes to initiate startup, for example, and hardware security, such as a dongle, for example, inter alia. Further, hardware-based copy protection techniques, as well as those which involve modification or customization of executable programs, prevent software vendors from exploiting the non-traditional distribution networks that are becoming a mainstay of software distribution in the software marketplace. Therefore, these protection methods have generally proved inadequate for large-scale commercial distribution of software. Thus, most large software companies have relied on shrink-wrap licenses and legal remedies to enforce their copyrights which have proved moderately effective.

Another challenge to the software industry is regulating the installation of software. Since individual users perform most installations of software, the vendor has no control over the software installation. A user can currently purchase software that will not run on the user's computer. The user may not know the limitations of the user's computer hardware or may not understand the software's hardware requirements. If a user purchases software and the user's computer hardware is inadequate to run the software, then various problems are going to occur in the installation and execution of the software on the user's hardware. The user will have to spend much time and effort attempting to resolve the problem, often including multiple calls to the vendor's technical support lines at a cost to both the vendor and potentially the user.

Additionally, companies having large networked facilities can internally have thousands of networked computers accessible by numerous content servers on a single network. Each of the content servers can be running any of various operating systems as can the computers with which the servers are communicating. From an information management standpoint, maintaining such a computer base can be very difficult given that each user may have to install their own software or, in the case of networked software, each server has an individual copy of networked software for a subset of the users.

Many computer users are reluctant to purchase software on-line due to security issues. The possibility of piracy of the software and, more importantly to the user, personal information inhibits many users from taking advantage of this method of transaction. Some on-line services include security features for such information, but generally lack an ability for the user or the service to audit the security of the transmission. In addition, on-line services generally do not allow the service to keep users informed of new products and releases, unless the users release personal information to the service.

In some environments, the security of the network and data transmitted and stored thereon is critical. Such networks and environments include military, legal, business, and financial services. As a financial services example, an investment trading system may be linked to a bank custody and accounting system, wherein the two systems exchange data so that the bank system can provide "settlement" services related to the trading system's investment transactions. Attempts to make such networks secure, preventing the theft or manipulation of data by insiders and outsiders, often involves using human entered passwords to gain access to the network. However, because such passwords exist in human readable form, it is possible to steal such passwords and gain access to the system. Such systems may also implement key encryption to secure the data, but if the system is violated through password detection or other means, the keys may be obtained and used, unknown to network administrators. As an example, a method presently used to protect transmission of data over a network is a virtual private network that uses digital certificates, which involves the use of various root private keys which are manually protected in a secure environment. If these root keys can be discovered or broken, the network can be compromised. These keys generally have a life of one or two years. If a key in one of these system is stolen, the theft cannot be detected. Consequently, these networks may be unacceptably vulnerable.

Additionally, these networks are typically large and complex and susceptible to the inclusion of "trap doors" during their generation and installation. A "trap door" is hidden software code that allows an application to secretly send data to unauthorized recipients, for example. Furthermore, the generation and installation is typically labor intensive, requiring programmer generation and manipulation of software files to build the necessary components and hand installation of these components at remote sites to build the network. Since the generation and installation is piecemeal and disjoint, it is not a quick process. Also, it does not lend itself to generating billing information of the clients receiving access to the network as it is being installed, since account services are not typically included until after the system or network installation is complete. Therefore, additional resources are required to generate necessary billing information.

Accordingly, it is an object of the invention to provide a private secure network and method for protecting electronically distributed and stored data from theft, both by outsiders and technologically sophisticated insiders. It is another object of the invention to provide an auditable secure network and method for auditing a secure network during generation, installation, and operation of the secure network. It is yet another object of the invention to provide a secure network and method for establishing and maintaining a high degree of data security in the direct connection between a trading desk in a securities firm and the settlement application in a custody bank, thereby facilitating real-time, or near real-time, settlement. It is a further object of the invention to provide a system and method for rapidly generating and installing an auditable secure network remotely. It is yet a further object of the invention to provide a system and method for systematically defining the types of data to be sent over a network to be generated and installed and for auditing performance against this definition. It is still another object of the invention to provide a system and method for generating billing information from a network installation. It is also an object of the present invention to provide a system and method for resolving security violations in a private secure network that requires verification by auditors.

It is further an object of this invention to protect transfers of cash among large financial institutions. When cash is transferred through electronic means, large quantities of cash can be transferred in a short period of time. Insiders who have access to the networks of large financial institutions might plan to install software that, at the appropriate moment, could overcome the security system and process a large illegal cash transfer. A further object of this invention is to install systems that can protect against insider theft of cash through electronic means, particularly where the insiders have time and technical knowledge to install sophisticated software to accomplish an illegal theft of cash.

These and other objects of the invention are achieved by the system and methods described herein.

SUMMARY OF THE INVENTION

The aforementioned and other objects of the invention are achieved by the invention, which is a system for installing a software application to a remote computer via a network. The network is one which has at least one content server located thereon, which serves data to a plurality of attached computer clients. This network model is intended to include both intranets and internets. That is, the network may be an internal corporate network, an intranet, or a global network of networks such as the Internet, for example. The system comprises a server module and an agent module.

The server module is disposed on the server. The server module maintains a database of software applications and constraints associated therewith. In the case of commercial distribution of the software application, the server module also maintains a database that includes billing information.

The agent module can be embedded in more than one type of software application, and is actuatable by the remote computer to initiate installation of the software application on the remote computer. Upon initiation, the agent module electrically communicates with the server module which selectively enables the installation. In the case of a commercial distribution of the software over the Internet, for example, the user, upon finding a software application which the user wishes to purchase, the user selects the software application. An agent module would then communicate with the server module.

In one embodiment, the agent module would be embedded in the software application the user selected to purchase, and it would be actuatable by the remote computer. After actuation by the remote computer the agent module would communicate with the server module. In another embodiment, the agent module embedded in the software application would remain inactive until after the software application was installed. In this embodiment, a second agent module, which for clarity will hereinafter be referred to as a plug-in, disposed on the remote computer would communicate with the server module. The plug-in would preferably be installed in the user's browser software, which the user is using to connect to the Internet.

The server module can be on a separate remote content server or the same content server upon which the software application is located. The physical location is not important to the individual modules as long as they can communicate electronically. The server module then transfers hardware constraints, pricing information and available options particular to the chosen software application to the remote computer.

The user of the remote computer then accepts the pricing, confirms acceptance of license terms and inputs user information, all of which is then transferred back to the server module as identification information. Upon verified receipt of the user's information, the server module then enables the installation of the software application by communicating with the agent module, either the agent module embedded in the software application or the plug-in embedded in the browser. Installation of the software application can then proceed over the network.

In other embodiments, where the pricing and payment of the software application is accomplished independently of the installation, installation of the software on a remote computer (i.e., target site) may be commenced in response to other parameters, rather than pricing and payment. For example, if a company or other organization procured several copies (or licenses) of a single application for several of its sites, payment of such software (or licenses) may be accomplished prior to the installation thereof or in accordance with a payment schedule. Therefore, payment and installation need not be related.

Where data security is a concern and the protection of data is necessary, the present invention includes mechanisms to prevent unauthorized copying or alteration of electronically stored and transmitted data by outsiders (e.g., "pirates") and trusted insiders. For example, the system performs generation and subsequent operation of a secure network without revealing embedded detailed security measures to software developers. The network includes a plurality of linked nodes, wherein each node is formed from the installation of a software application on a predetermined remote computer or target site. A monitoring capability is used to ensure security is maintained and to respond to security violations and human auditing of the network may be employed to verify proper installation in accordance with a network definition template. Once completed, the template substantially defines, in human readable form, the network from a top level, including identification of each node, identification of each link between nodes, identification of data types to be exchanged between nodes, and identification of a software application to be installed as part of each node. A set of agent library functions is included with the application to facilitate communication of each node with the rest of the network.

An agent module generator receives the template information and generates network components therefrom. For each specific node identified in the template, a unique agent module and a node configuration file is generated, including information about each link of which the node is a part. A network information file, or files, is also generated which embodies the overall network structure. For each link, as part of each agent module, a pair of keys is generated, one key corresponds to data transmission over the link in one direction and the second key corresponds to data transmission in the opposite direction. A key is a series of binary bits, probably not human readable, which is used as part of an encryption algorithm. Each agent module is loaded, either over a network (e.g., the Web) or manually from a computer disk or CD ROM, for example, onto its corresponding target site. Once loaded, the agent module is executed, configures itself, and communicates with an installation server (i.e., server module) in a secure, encryption key based manner to load the requisite software application onto the target site. Once the application software and configuration file are downloaded and executed on a target site, the node communicates with a monitor node to gain access into the network. The agent module should be used to install the link as soon after it is constructed as possible.

As part of the auditing of the installation of each network node, the input of a local sales password may be required for downloading the node application software and configuration file and input of an audit password may be required for installation of the node into the network (via the monitor node). A password is a string of numbers and letters which is used by humans to gain access to a computer system. The monitor node oversees the installation and subsequent operation and security of the network. If an attempt is made to install a node more than once, the monitor node may shut down that node or the entire network. The feature that a node may be installed only once is important to prevent an attack whereby an agent module might be stolen and then used to attempt to install a node from a location other than the target location. Even if the thieves somehow were able to spoof that the fraudulent node was the real node, when the legitimate attempt was made to install the correct node, the deception would be uncovered. An account server may also be included which, among other things, tracks the installation of each node for billing purposes.

Communication between nodes requires a dual login between the two nodes seeking to send and receive data, using the keys for that link. These keys are randomly generated data, and may be changed periodically. Communication is further protected using encryption with unique, randomly generated public-private key pairs. One pair of keys is generated for each node in the link. Of the pair, one pair of keys is dedicated for data transfer in one direction over the link and the other key is dedicated for data transfer in the other direction. The private key is randomly generated when an agent module is executed for the first time on its node, and is generally used to decrypt data received by the node. The node's public key is generated from the private key using a known encryption algorithm (e.g., RSA) and is used by another node to encrypt data to be transmitted to the node that generated the public key. A session key for the node may also be generated for a given communication session. The session key is used to perform a second encryption on the data to be transmitted. Session keys are shared by the nodes in a link Each node in the link passes its public key to the other node. When a sending node prepares to transmit a message to a receiving node, that message is encrypted with the receiving node's public key and then again with the session key. The receiving node uses the session key and the receiving node's private key to decrypt the message. Rather than one shared session key, each node may, alternatively, have its own session key, which is encrypted and sent to the other node in the link.

For increased security, the keys may be strobed, that is, changed every few seconds. The monitor node controls the strobing of keys between nodes. Critical node pairs may be strobed at regular or erratic intervals, possibly every 2 or 3 seconds, whereas less critical node pairs could be strobed at longer intervals, possibly every 5 to 10 seconds. To strobe, each node randomly generates a new private-public key pair and session key and passes the public and session keys to the other node in a secure manner. Each node involved then stores the other node's keys for decryption of messages received from that node. When strobing is performed between two linked nodes, in-progress communication between the two nodes, if any, must complete before the strobing takes place. In another embodiment, strobing is accomplished with persistence of the current and previous set of keys from each node in the link being strobed. Therefore, if a node, a link, or the network goes down, the links will attempt to come back up using the current set of keys, but may default to the previous set of keys if unsuccessful. This can be particularly useful if a node goes down during a strobe.

Unlike the manually protected root keys of typical virtual private networks, which may have a life of a year or more, the private keys under the present invention have an initial life that consists of the time between when the keys for the agent modules are generated by the server and when the modules use these keys to make an installation. This time period could be as short as 15 minutes, for example. Thereafter, when the system is installed, the keys are changed or strobed every few seconds. Thus the present invention substantially diminishes the time during which private keys remain valid and substantially reduces the risk of the private keys being stolen and used by pirates. Moreover, the present invention includes methods for detecting theft during the relatively brief period when a private key is in effect.

With regard to installation, there is a window of opportunity, between the time the agent is generated and the link is installed, during which the pirate could steal the private key from the server and construct a phony server so that, at the time of installation, the phony server could spoof to the agent that it was the server and to the server that it was the agent. This type of attack would require a "mole" in the installation server room capable of stealing the private key and with software that could immediately generate a phony server.

The present invention, preferably, includes a method of detection of this type of attack by auditing the installation to compare the server public key used by the agent or the installed application to the actual server public key: if they are different, a pirate has interposed itself between them. This comparison can be effectuated by a proper auditing procedure that uses human beings to communicate certain control values from the installed site to the audit server through means which are not related to the network connecting the installed site with the server.

Thus, unlike the case of the root keys used in a digital certificate system, if a private key is stolen under the present system it can be detected before the system is installed.

Also, there is a very narrow window of opportunity (a fraction of a second) for a pirate to interpose itself when the network is in operation. If a pirate did penetrate an installation server room and steal private keys and session keys instantaneously as they were generated, it could possibly interpose a node on the network. This type of security violation can also be detected by human audit of the network. The network can be automatically audited every few seconds by using two monitors, where the second monitor is used to compare the two keys. For pirates to penetrate a two-monitor network, they would then have to be able to instantaneously steal private keys from two separate secure sites.

Thus, when the network is in operation, the window of opportunity during which a private key can usefully be stolen is a fraction of a second compared with a year for a digital certificate system. Moreover, the present invention includes a method to detect an interposition even within a fraction of a second.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof as well as the invention itself may be more fully understood from the following description, when read together with the accompanying drawings in which:

FIG. 14 is a block diagram of a functional bank—client private secure auditable network to be generated and installed using the system of FIG. 6 and FIG. 14B is template from which the system in FIG. 6 will generate and install the network described in FIG. 14A;

DETAILED DESCRIPTION OF THE PREFERRED EMBODIMENT

While the present invention retains utility within a wide variety of networks and may be embodied in several different forms, it is advantageously employed in connection with the Internet. Though this is the form of the preferred embodiment and will be described as such, this embodiment should be considered illustrative and not restrictive.

Figure 1:
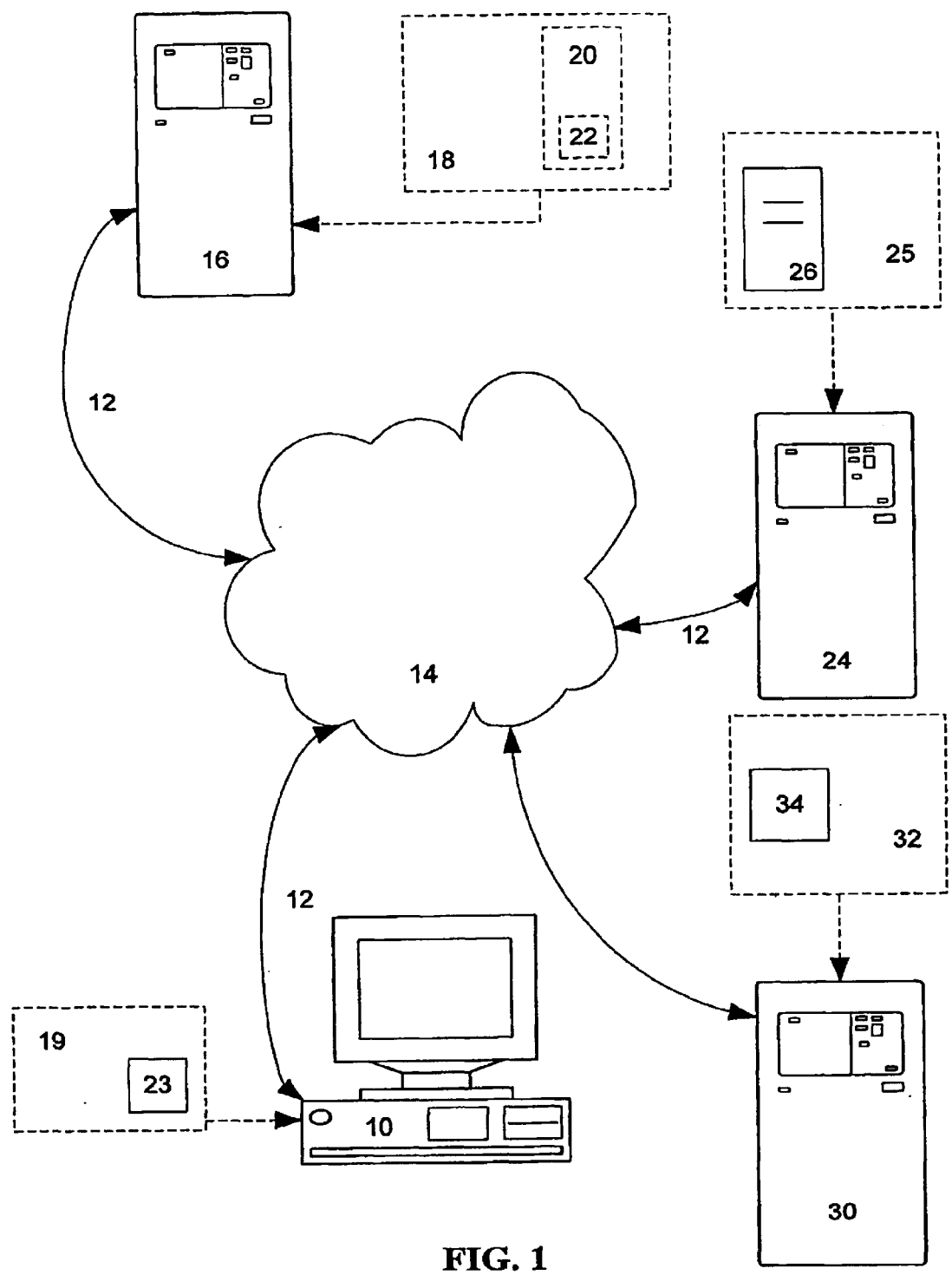
FIG. 1 is a block diagram of the software distribution system of the invention.

Referring now to FIG. 1, a remote computer 10 is shown having an electrical connection 12 to a network 14. The remote computer 10 can be a personal computer, such as an IBM compatible or a MAC, can be a work station, or any other such computer that is adapted to communicate over a network 14. The electrical connection 12 is used generically to indicate a physical connection to a client/server network. Though such a connection can take any of various forms and use any of numerous protocols, in the preferred embodiment communication via the electrical connection 12 uses Transfer Control Protocol/Internet Protocol ("TCP/IP"). TCP/IP is preferred as it is the communication protocol suite required to communicate over the Internet. Communication over the Internet is desirable because the Internet is a global interconnection of multiple content servers which are freely communicable to each other and accessible by an unlimited group of remote computers. For illustration purposes, the network 14 will be assumed to be the Internet, though other possibilities exist, such as electronic mail networks utilizing X.25 protocols.

As previously stated, the network 14 has multiple content servers, one of which is 20 shown in FIG. 1 as content server 16. The content server 16, in this example, is owned by a third-party vendor of software. The software can be any digitally stored information including both executable and non-executable digital information. Examples of the foregoing are executable software applications, digitally stored music, digitally stored reference materials, photographs, inter alia. Therefore, any reference to software or software applications contained herein shall be understood to encompass any form of digitally stored information whether or not listed as an example above.

The third-party vendor uses the content server 16 to sell software by using a virtual store 18. The virtual store 18 generally provides a large listing of available software from which a potential purchaser can choose. When a user of the remote computer 10 decides to purchase a software application 20 from the virtual store 18, the remote computer 10 sends a message via the electrical connection 12 over the network 14 and through another electrical connection 12 to the content server 16. Since the virtual store 18 is simply an application running on the content server 16, the content server 16 actuates the installation functions of the virtual store 18 for the selected software application 20. The installation functions on the content server 16 are generally governed by an agent module which the user of the remote computer 10 is using to access the virtual store 18.

In one embodiment, an agent module 22 is embedded in the software application 20. The agent module 22 is actuatable by the remote computer 10 to access the virtual store 18. The agent module 22 is embedded into the software application 20 by a developer of the software application simply by incorporating a library of functions which make up the agent 15 module 22.

In another embodiment, the agent module 22 embedded in the software application 20 is inactive until after the installation of the software application 20 on the remote computer 10. In this embodiment, a second agent module, a plug-in module 23, is installed on the remote computer 10 and used to access the virtual store 18. The plug-in module 23 is made available on the Internet or other well known resources or by other well known methods, for installation on the remote computer 10 by the user. The plug-in module 23 is preferably disposed in a software package 19, a browser, which the user of the remote computer 10 uses to access the virtual store 18. When the agent module 22 is actuated the agent module 22 and the plug-in module 23 have the same functionality, and the agent module 22 and plug-in module 23 are used interchangeably by this invention, although for clarity the embodiments will refer to one or the other module.

Upon being actuated by the virtual store 18, the plug-in module 23 sends a message via the network 14 to a server module 26 disposed on a remote server 24. One skilled in the art will realize that this example describes a remote server, but the invention will work as described if the server module 26 is also disposed on the content server 16. This particular example allows multiple content servers 16 to communicate with a single server module 26, and therefore the server module 26 is disposed on a data storage apparatus 25, such as a hard disk or any other means for storing digital information, on the remote server 24.

The server module 26 maintains a database of software applications. The developers have previously registered the use of the software application with the server module 26. If the developer had neglected to perform the registration, then this first installation attempt would fail and the server module 26 would attempt to contact the developer.

The database contains information relating to the software applications comprising the name of the application, the developer, hardware constraints, operating or other software constraints, pricing information and any other particular instructions or information helpful for the installation.

The server module transmits the installation information and the license agreement, which the agent displays in a dialog box. If the user chooses to read the license agreement prior to acceptance, the text is sent to the remote computer either from the server module 26, from storage within the database, or a link to the developer's page on the World-Wide Web is exercised. In either case, acceptance of the license is generally required before continuing, though the developer may choose to perform this function during the software installation itself.

In the preferred embodiment, the dialog box displays information prepared by an 25 independent auditor relative to assuring that the installation software performs only certain limited functions strictly necessary for the software installation and does not examine or transfer other data from the remote computer 10. The dialog box also gives the user the option of verifying the credentials of the installer.

If the user exercises the option to verify the credentials of the installer, the plug-in module 23 connects to an audit server 30 maintained by an independent auditor. The plug-in module 23 links to a verification program, which simply incorporates a library of functions that make up an audit module 34, disposed on a hard disk 32 in the audit server 30. The user is then invited to enter a number displayed on the display screen of the remote computer 10 by the plug-in module 23 which is a code representing the installer. The verification program 34 then authenticates the audited installer by providing the installer's name and details regarding the nature of the audit which the auditor has performed. Alternatively, the verification program 34 could be automatically initiated by having the plug-in module 23 transmit the code to the audit server 30.

The user must then input personal information, such as name, address and phone numbers, as well as billing information, such as a credit card number for example. The billing information usually must be included to enable the transaction. In the preferred embodiment, both the billing and the user information are kept confidential and are, therefore, transmitted using secure methods.

Any of various secure methods can be used, such as encoding the information in a known manner readable only by the server module 26, for example. Other such secure methods comprise key-escrow encapsulated within an application program interface ("API") such as a Secure Socket Layer in NETSCAPE, a trademark of Netscape, Inc., or CRYPTOAPI, a trademark of Microsoft Corporation.

Once the billing information is verified and the user information is recorded in the database maintained by the server module 26, the server module 26 transmits an enabling command to the plug-in module 23 which allows transmission of the software application to the remote computer 10. The software application 20 is transmitted as an installation program which is then installed locally to the remote computer 10.

The agent module 22 embedded in the software application 20 remains enabled and active, and maintains communication with the server module 26. At predetermined intervals, once a week for example, the agent module 22 can then correspond with the server module 26 and inquire as to whether any updates are available to the software application. The server module 26 can then inform the agent module 22 of updates or any additional marketing information which the vendor would have the user of the software application 20 know.

Figure 2:
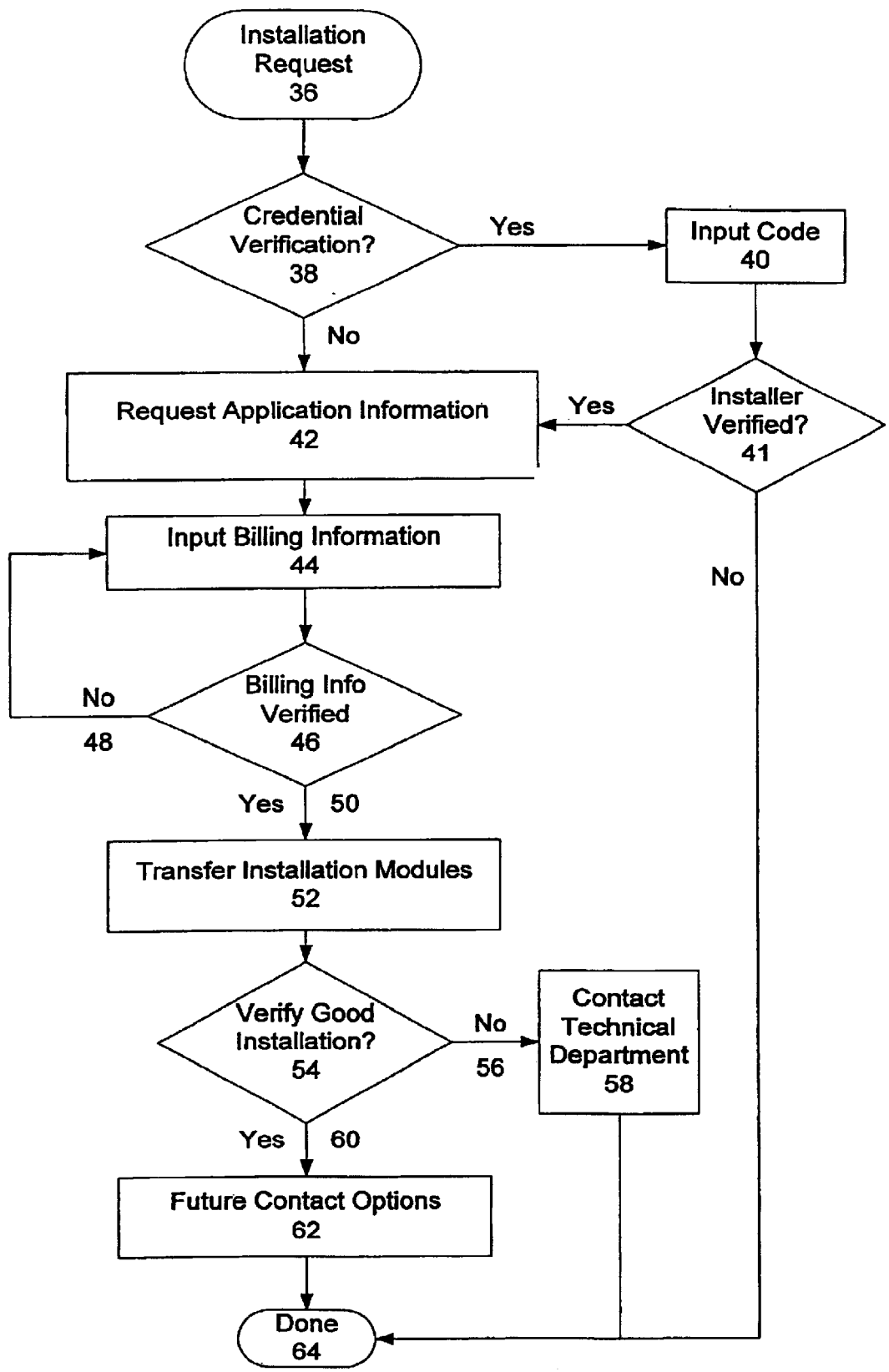
FIG. 2 is a data flow diagram for the installation of software over the system of FIG. 1.

FIG. 2 shows a flow diagram of a method which will be described with reference to the system of FIG. 1. As previously described, an installation request 36 is first received by the plug-in module 23 after a user decides to purchase the software application 20.

The user is then queried whether installer verification is required 38. If so, then a code given to the user by the plug-in module 23 is input 40. The code helps determine information appropriate to the software application 20 and the installer, which should be transmitted to the user. If the installer information is sufficient and the installer is verified 41, then the installation process is continued. Otherwise, the installation is terminated 64. The server module 26 is then contacted 42 by the plug-in module 23 and pricing, constraint information, and any special instructions are then transmitted to the user of the remote computer 10.

As previously described, in the preferred embodiment the user is provided with information by the independent auditor regarding the limited functionality of the installing program. The user is given the option of verifying the credentials of the installer. If the user chooses this option, the user is given the option of connecting to the auditor via a Web Browser such as NETSCAPE or directly by the plug-in module 23. Once connected to the audit module housing the verification program 34 disposed on the audit server 30 provided by the independent auditor 36, the user will have the opportunity to review the assurances provided by the auditor and to verification that the installer is known to the auditor. To perform the verification, the user would enter a code which might be a checksum for the installer and the software application 20 of the installer, would appear on the user screen 10. Using this code, the auditor would verify that the installer is certified by the auditor. At this stage, the user also has the option of registering with the installer by entering user information such as name, address and phone number, regardless of whether the user will purchase a software application from the installer. After the verification, the user would also have the option of terminating the installation.

The user then inputs billing information 44. The billing information can be credit 10 card numbers, debit card numbers, a pre-established account number, or a bank account number or any of various other finance related numbers or forms of electronic commerce.

At this stage, the user has the option of entering user information such as name, address and phone number, so that ultimately the installer can track who is using the software application 20. The plug-in module 23 at this point also extracts from the remote computer 10 serial number information or any other information particular to that remote computer 10 that is software accessible. In the preferred embodiment, the other information includes hardware and configuration information of the machine. The remote server 24 via the server module 26 is used to determine whether or not the remote computer 10 is capable of running the software S application 20 which the user intends to purchase. Often such serial number information is retrievable simply by making a call to the BIOS of the remote computer 10. Both the information specific to the remote computer 10 and the user of the remote computer 10 may be stored on the data storage apparatus 25 as identification information.

The billing information is then transferred back to the server module 26, which 25 verifies the billing information 46. Such verification in the preferred embodiment is done by communicating the numbers to a central source of verification in much the same manner as is done for conventional transactions. That is, the credit card number is transmitted to a credit card number verification service and a verification code is transmitted back. If the billing information is not accepted 48, then the user is invited to input new billing information 44. If the billing information is accepted 50, then the plug-in module 23 is sent an enabling signal which allows transfer of installation modules 52 of the software application 20 to the remote computer 10. The installation modules are generally executable modules which are created by the server at the time of a request by the plug-in module 23 so as to contain only the particular product options which the user has purchased. Therefore, the executable code can be configured so that it will only operate on the remote computer 10 for which the user has purchased the application software 20.

The executable code is transmitted as a self-extracting executable as is well known in the art. The plug-in module 23 then executes the self-extracting executable which proceeds to automatically install the software application 20 on the remote computer 10.

The user then follows the procedure proscribed therein to install the software on the remote computer 10. The server module 26 during this process monitors the installation to verify the installation 54. Upon completion, the plug-in module 23 in the software application transmits installation information back to the server module 26. If the installation failed, or was unsuccessful 56, then the installation logs and the identification information are transmitted to a technical department 58 of the installer or the developer such that contact can be made to the user directly. The transmission to the technical department can be by any known communication method including manual contact. In the preferred embodiment, however the technical department would be disposed upon the network and in electrical communication with the server module 26. The technical support person would then have, prior to making any contact with the user, complete information related to the hardware and software and the installation attempt, all prior to contacting the user thus expediting the support process.

If the installation was successful 60, then the user inputs whether the user wishes automatic notification of future updates and relevant messages 62. If the future contacts are enabled then each time the vendor of the software application 20 updates the software application 20 or transmits information relevant to the software application 20, the agent module 22 detects the message/change and informs the user. The procedure is then complete 64.

Figure 3:
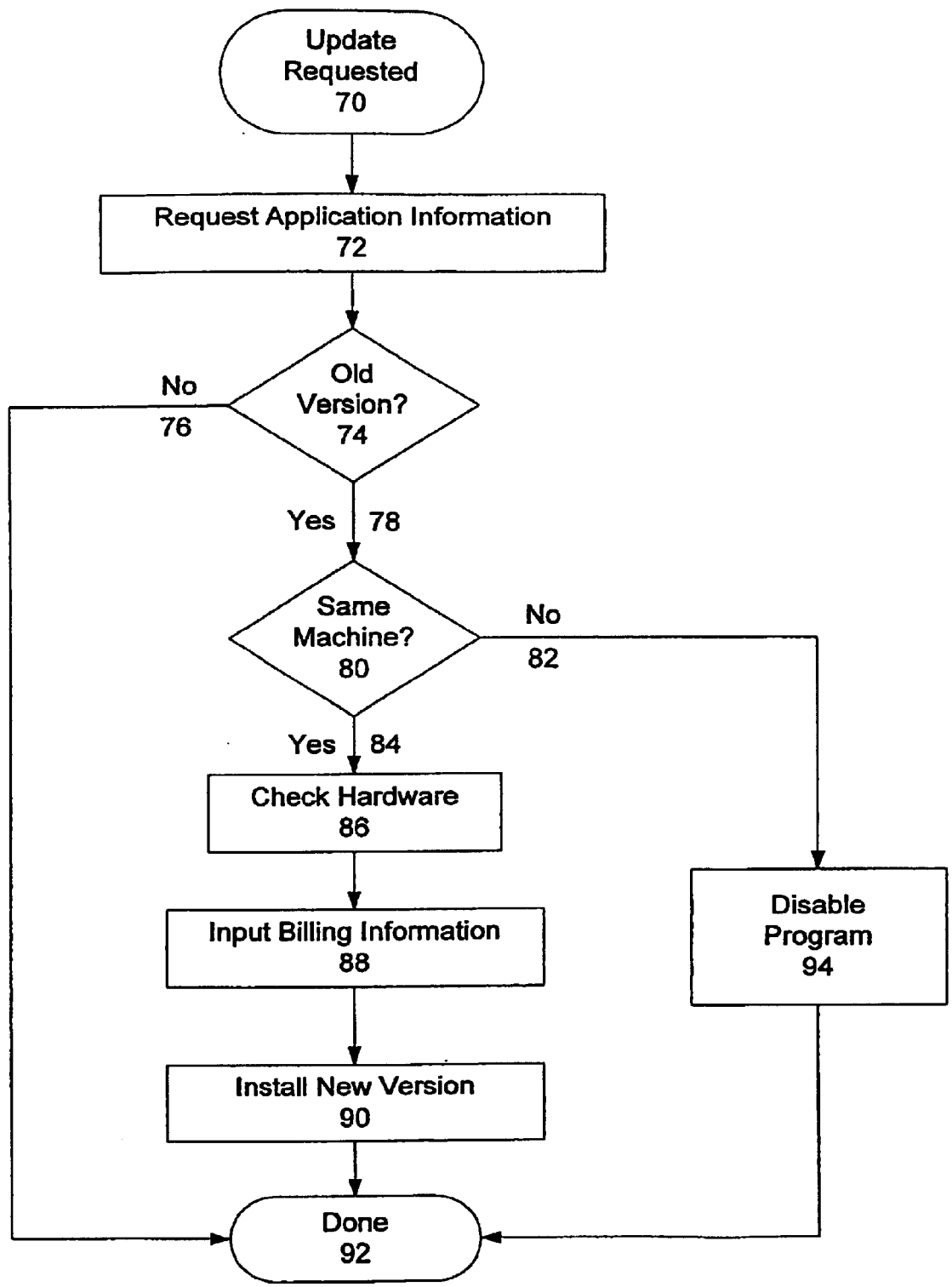
FIG. 3 is a data flow diagram of a software update procedure for the system according to FIG. 1.

FIG. 3 is a method similar to that of FIG. 2 and will be described with reference to the same system of FIG. 1, but in this method an update is being requested 70. An update is requested generally in one of two circumstances: the user has received a demo version of the application software on either a physical medium, such as diskette or CD ROM, or has downloaded a demo version from the vendor, or a new version of the software has been produced by the developer. In either event though, the user is requesting to purchase a new version from the vendor.

If the software is a demo version, then there would generally be a soft button in the graphic user interface ("GUI") that allows the user to buy the software. Selecting the button activates the agent module 22, the agent module 22 then contacts the server module 26. If a new version of the software has been produced then, as previously described, the agent module 22 which periodically contacts the server module 26 for information on new versions has likely informed the user of the availability of the new version. In this case, the agent module 22 is simply being instructed by the user to update the software application 20.

In either event, the update request 70 actuates the agent module 22 to send a signal 20 to the server module 26 requesting the update while also transmitting the identification information 72. The identification information is again secure, like the billing information, and includes user information and computer information specific to the remote computer 10, as well as information relating to the software application 20 which is to be updated.

A check is performed to confirm that the update is being requested by the same 25 remote computer 10 on which the software application 20 was originally installed 80. Then, the server module 26 checks for the availability of a newer or a full version 78. In this way, piracy is inhibited in that the same remote computer 10 must be requesting the update as was the one that originally requested the software application 20. Under some circumstances, the remote computer 10 may change for reasons other than pirating software. Such circumstances can include replacing the computer with a more modem computer or transferring the software application 20 pursuant to the terms of the license agreement to a third party. Under these circumstances, the user may transfer the information specific to the remote computer 10 to the new computer as long as verification is made that the old computer either no longer exists or is no longer loaded with the software application 20.

A comparison 74 is then performed in the remote server 24 to check whether the 10 software application 20 is an old version or is a demo version. If it is the most current version 76, then the procedure is complete 92 and the update request is canceled.

If this request is not made and it is determined that the user is pirating the software 82, then a signal is sent from the server module 26 to the agent module 22 in the remote computer 10 to disable the program 94. The program will then no longer be usable by the remote computer 10 and only the complete new installation including a purchase of the software will re-enable the software.

If the remote computer 10 is the same machine 84, then the hardware constraints are then rechecked 86. This is to insure that the new updated software does not have additional hardware constraints that the previous version had not had.

If the software update is more than simply a maintenance update, there may be additional billing necessary. The user is then enabled to use the previous billing information or input new billing information 88. Upon verification of the billing information, the new version is then installed 90 and the procedure is complete 92.

Figure 4:
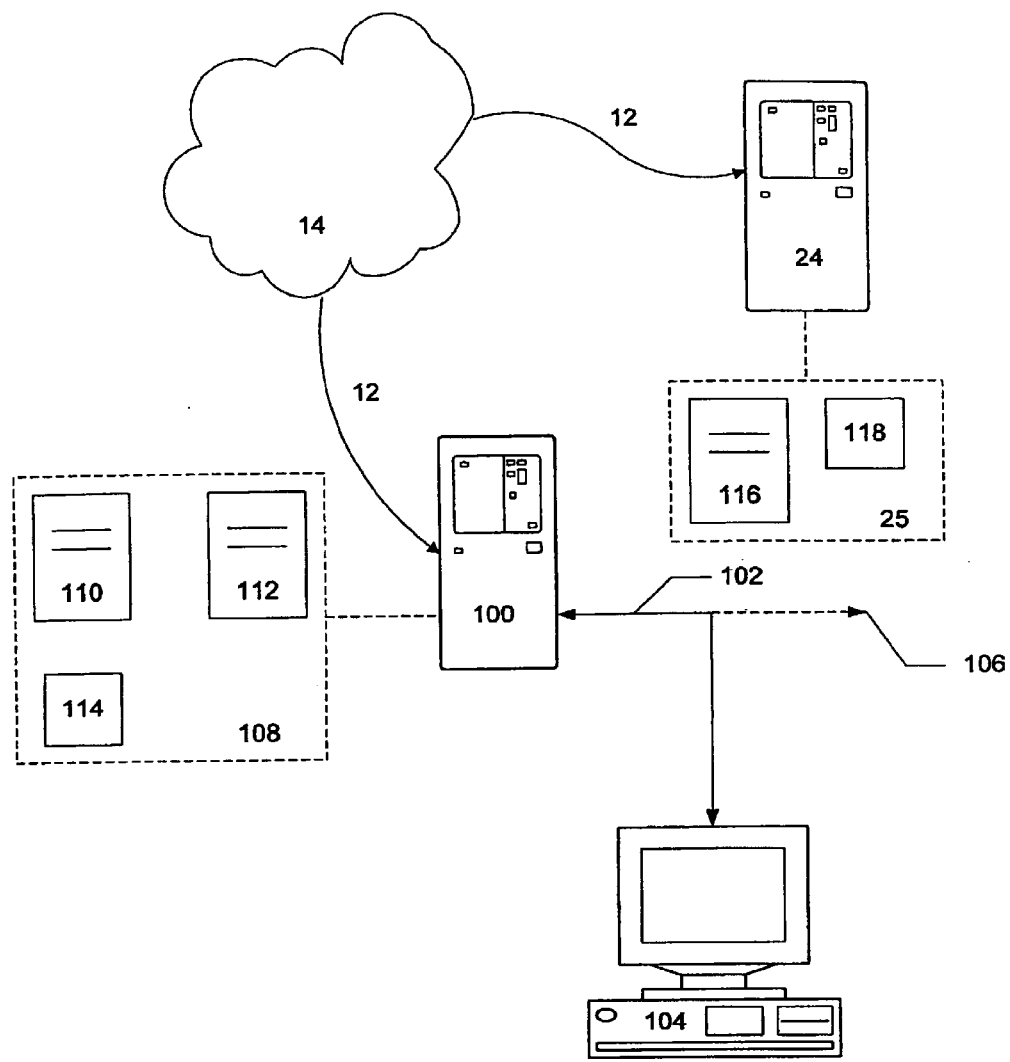
FIG. 4 is a block diagram of a corporate network utilizing the invention.

Referring now to FIG. 4, another application of the invention is shown. A corporate network 102 is shown having a corporate server 100. The corporate server 100 is in electrical communication with both the corporate network 102 and the outside network 14, i.e., the Internet. The corporate network 102 provides a communication bus for a client computer 104 as well as numerous other client and server computers 106.

It should be noted that a typical corporate network, or intranet, of a large corporation is actually quite like the previously described Internet in that a great variety of networks and equipment are linked together through a variety of sub-networks and routers. Again, like the Internet, there is almost no method in such a network to install or de-install software across subnets, and certainly not across different networks.

In this embodiment, the user of the client computer 104 wishes to purchase a new software application. The installation and payment can proceed exactly as previously described for a non-networked computer if so desired. Generally though, a corporate network has network administrators who try to keep software applications uniform and purchasing departments, which try to govern spending. Therefore, in such an installation, the corporate server 100 contains on its hard disk 108 multiple software applications 110, 112, each having an agent module embedded therein as previously described.

The system administrator for the corporate network 102 would generally purchase a predetermined number of licenses for the software application 110 using a method similar to that previously described or upload them directly from a vendor's disk. The user would then access the software application 110 using the client computer 104 via the corporate network 102. Requesting installation of the applications software 110 causes the agent contained therein to contact a server module 114 which, in this embodiment, is stored on the hard disk 108 of the corporate server 100. The server module 114 monitors the number of licenses and, if more are available, then enables the installation.

If additional licenses are required, the server module 114 contacts the remote server 24 and requests additional licenses 116. If the system administrator has approved the transaction, for example by having a standing pre-approval of no more than two additional license without confirmation, then the license 116 is downloaded and a message is sent to the system administrator.

Periodically, an auditing module 118 on the data storage apparatus 25 of the remote server 24 queries the corporate server 100 for information relating to licenses and installations. The server module 114 then transfers such information to the remote server 24.

The capability of being audited by an independent auditor provides a user assurance that the user's privacy will be protected. The auditing system herein described is physically and organizationally separate from a software developer, the virtual store, or, in the case of a corporate intranet, a department of the corporation. This separateness allows for a server to be dedicated to the sole task of installing software and for this server to be placed in a physically secure setting. Thus, the remote server 24 can be situated in a locked room dedicated solely to the task of installing software. By periodically examining the disk of this server with software appropriate for this task, which is well known in the art, the data returned to this server could be verified not to contain any data other than that required to complete the installation.

Figure 5:
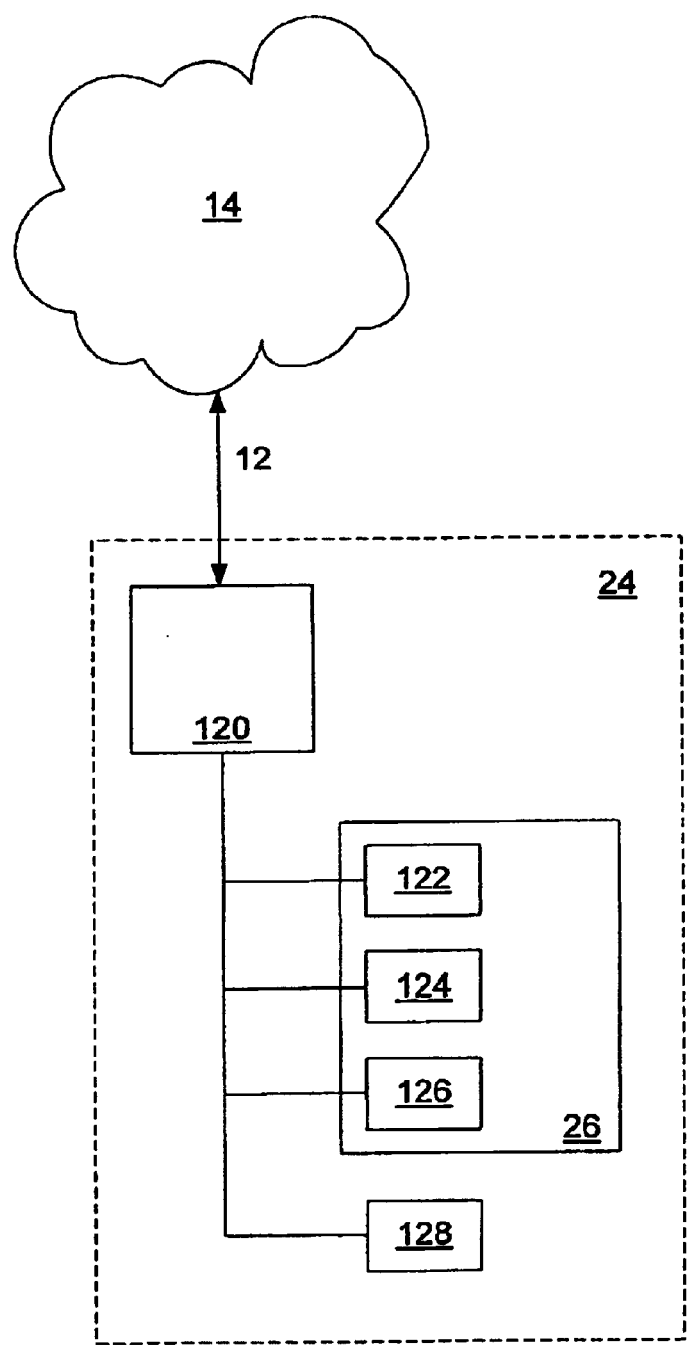
FIG. 5 is a block diagram of a portion of a corporate network utilizing the invention, wherein the remote server includes multiple servers.

FIG. 5 shows a system configuration where the functions previously handled by the single remote server 24 have been divided among several servers and should, therefore, be read with continuing reference to FIG. 1. A router 120 routes incoming data to appropriate servers. Initially, when an agent module contacts the router 120 the request is transferred to the receptionist server 122. The receptionist server 122 verifies that the request is from an authorized agent module, and then transfers the request to server A 124 or server B 126. Servers A and B 124, 126 actually perform the installation.

The receptionist server 122 monitors which of servers A or B 124, 126 are currently busy and routes new requests to the less busy server 124, 126. Thus, the use of the receptionist is useful to provide loading to other servers to maintain appropriate levels of service and also provides for a configuration that is highly scalable, since additional capacity can be added simply by adding additional servers.

In an alternative embodiment, each of servers A and B 124, 126 store a predetermined set of applications. The receptionist upon receiving a request for installation of a an application stored on server B 126 automatically routes the request to that server.

Also shown is an audit server 128 which is used to continuously audit the operations 5 of servers A and B 124, 126. In the preferred embodiment, the auditing operation also includes monitoring of data received by servers A and B from user of the remote computer. The auditing server 128 communicates with the independent auditor so that periodically or on demand the auditor is able to verify the actual operation of the servers A and B 124, 126.

The auditing operation that would take place has a dual function. The owners of the virtual store 18 are able to have accurate records as to the software that was actually installed. The user of the remote computer 10 would have the assurance that only data needed for the installation and options chosen by the user were in fact transferred to the remote server 24.

An additional design element of the system herein described is that it will use an exclusive audit-capable packet (XAP) to transfer data from the remote computer 10 to the remote server 24. The auditor can audit this capability by examining the C++ code, as described below, by observing a build of the software, and by verifying that the software actually running on the servers is the same software as that produced by the controlled build.

The following is an example of the steps that an independent auditor would use to verify that the software performs in a specific manner and does not violate the privacy interests of the user. The method described below of auditing the functionality of the software will be described using C++ calls. The C++ language is used due to its inherent mechanisms for systematic data typing such that the exact nature of data passed in packets can be controlled and defined. One skilled in the art will recognize that these steps can be performed in other languages with like functionality without departing from the essence of the invention.

In order to certify the operation of the server, the auditor first examines the software for the server and the agent. The auditor performs or observes a build of the software from the sources and verifies, through its audit server or by other means, that the software that was built in is the same software actually running on the remote server 24. Finally, the auditor supplements and confirms this audit by examining the actual data received by the servers.

To accomplish this task, the auditor determines from the sources that the software can only receive a XAP_Packet class and that the software can only send a XAP_Packet class. The auditor then examines the software and verifies that a XAP_Packet can only contain certain types of data and notes that this data is necessary for the installation of the software and does not include data that is not necessary for installation of the software.

The auditor verifies that the TCP/IP receive function occurs only inside a class XAP_Receive, and appears only inside this class. The auditor verifies that a XAP_Receive class can only be created using a XAP_Packet, and the auditor observes that the only interface to the rest of the application from the XAP_Receive class is through the XAP_Packet. From these observations, the auditor concludes that the application can only receive data that can be inserted into a XAP_Packet.

The auditor verifies that the TCP/IP send function is encapsulated in a class XAP_Ship, and appears only inside this class. The auditor verifies that a XAP_Ship object can only be created from a XAP_Packet, and that therefore, without a XAP_Packet object the application will cannot ship data over TCP/IP. The auditor verifies that the TCP/IP ship function only ships the data provided to it by XAP_Packet. From these observations, the auditor concludes that the application can only ship data that can be extracted from a XAP_Packet.

From examination of the sources, the auditor observes that a XAP_Packet can only be composed of XAP_Record objects. C++ has facilities for defining insertions and extractions from classes, which can limit the insertions and extractions to certain other classes. The XAP_Record classes are defined in the application. The auditor examines each of these classes. From examination of the individual XAP_Record classes, the auditor concludes that these classes can be composed only of certain XAP_Data objects. Again the XAP_Record classes has defined insertions and extractions which limit the data that can be put into these records to XAP_Data objects. Finally, the auditor examines the various defined, XAP_Data objects, and observes that the XAP_Data objects represent the data needed to perform an installation but will not permit other data that might violate a user's privacy. For example, the data objects could have predefined limits on overall length and predefined data values which would render impossible the copying of correspondence from the user's personal computer. The data objects would be limited as to size and content so that bitmaps or spread sheets, for example, could not be copied from the user's personal computer.

In another embodiment, it may be imperative to maintain a high level of network and data security, while accomplishing an automated installation of the network and a software application to be run thereon. For instance, for some large distributed organizations (e.g., a financial or investment related organization), it may be desirable to install a networked application at geographically remote sites. The network may include sites from a plurality of organizations, and the software application may involve the exchange of financial or other sensitive data between sites (or "nodes"). Typically, with such sensitive (e.g., financial) data security is of the utmost importance to all parties involved.

Figure 6A:
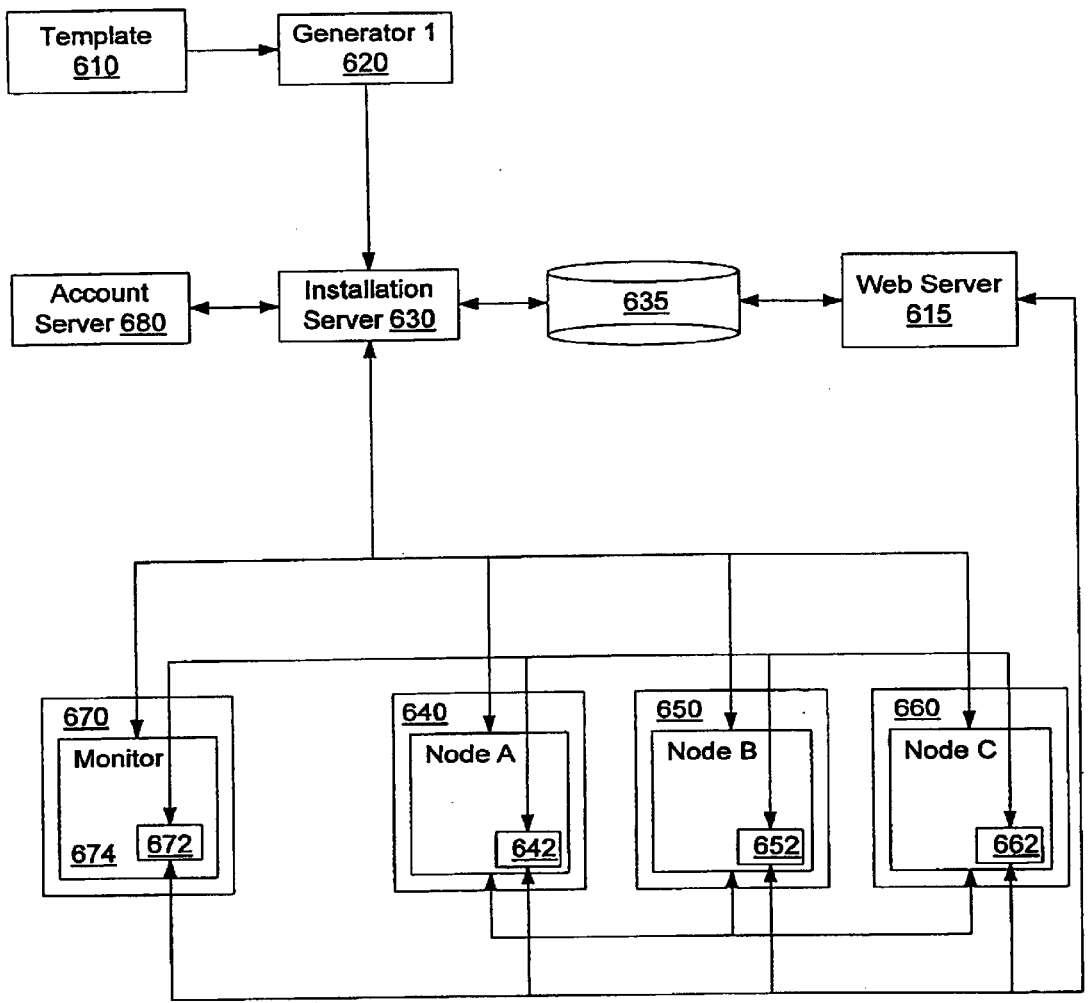
FIG. 6A is a block diagram of a system for generating and installing a private secure auditable network, in accordance with the present invention.

FIG. 6A depicts the preferred embodiment of a system 600 for generating, installing, and maintaining a secure network, including a plurality of application nodes (or "nodes"). To achieve a high degree of security, the system includes measures for protection from outsiders (e.g., "pirates") seeking to steal data and technologically sophisticated insiders (e.g., software developers) with mal intent. These measures include a dual login procedure using a unique pair of keys generated for each link. These keys are, preferably, long binary codes that are "hidden", that is, never stored in unencrypted (i.e., human readable) form. Each node of a link, logs in to the other node in the link using its key, so each key corresponds to data transmission in one direction over the link. Because the keys are hidden, even trusted individuals, like software developers, can not determine the keys for a given link. Data is encrypted for transmission using encryption keys, wherein each node in the network has its own unique private-public key pair. End-to-end encryption is used to enhance security, wherein data is not decrypted and made vulnerable at any point in the transmission from a sending node to a receiving node. Session keys may also be randomly generated between two nodes to encrypt data to be transmitted over a link. For an added measure of security, these keys are preferably strobed (i.e., randomly generated anew) at fixed or random short intervals, such that even if these keys were determined, they would have been changed before a corruption or violation of the network may be accomplished. To further enhance the security of the network, intermediate auditing steps may be performed, such as human verification that the delivered applications are, in fact, installed and running on the proper site. In such a case, installation of the network is preferably paused awaiting such auditor authentication. Auditing nodes may also be included to audit software at a packet level, during builds, as previously described.

Figure 7:
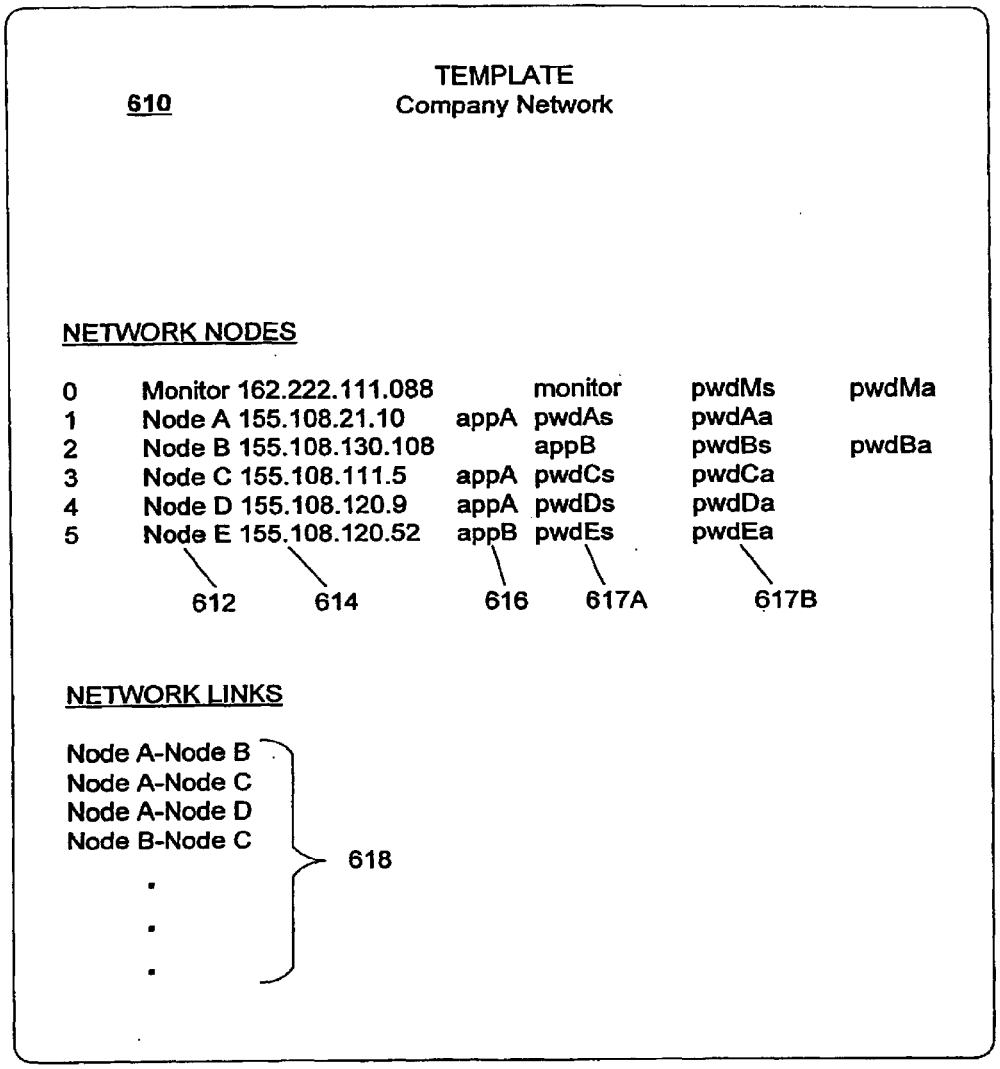
FIG. 7 is a diagram of a template used with the system of FIG. 6.

The system for generating and installing a secure network 600 includes a generator 620 that generates all of the components, as software modules or files, which substantially become the secure network when installed on remote computers or target sites. Network generator 620 is a software program running on a standard server. The generator 620 also generates components needed to install the secure network and establish communications among the nodes, including agent modules, node configuration files, and network information files. These components are generated in response to the input of information contained in a template 610. A partial exemplary template 610 is shown in FIG. 7 and includes network node names 612, node IP addresses 614, identification of the applications 616 to be installed on each node, links 618 between nodes and passwords 617. The monitor node connects to all other nodes. These connections are assumed and not shown in the links section 618 of the template 610 used to configure a specific network. The agent modules 642, 652, and 662 (for the target applications) and 772 (for the monitor) are stored in memory 635 or on a disk and each agent module is ultimately loaded onto a predetermined target site 640, 650, 660, and 670, respectively. The agent modules may be delivered to their corresponding target sites by any of a variety of means. For example, an agent module may be stored on a computer disk, the disk may be transported to the target site, and the agent module may be loaded on the target site from the disk. As another example, agent modules may be accessed and downloaded over the World Wide Web via a Web server 615.

The node configuration files and network information files are loaded on an installation server 630, and the agent modules are registered with and accessible by installation server 630. The installation of the network is primarily accomplished by the installation server 630. The applications to be installed are stored in memory and at least some components may be accessible by the installation server. The applications may or may not be loaded on the installation server itself. Each application is linked to (or includes) an agent module library file which includes functionality and routines that manage the communication between the agent module and other nodes and servers within the network. A node, node 644 for example, is considered installed when a predetermined application has been loaded on a predetermined target site 640 and the node has entered the network (i.e., linked to other nodes as defined in template 610). Since all nodes are not likely to be installed simultaneously, nodes are typically added to the network incrementally and each node's links are established as the node enters the network.

A monitor node 674 (or "monitor") manages the security of the network, the strobing of keys and passwords, and the termination of a node or the network in response to a security violation. Because of its unique interaction with the other nodes in the network, monitor node 674 must be the first node installed. Monitor node 674 links to each other network node as the nodes are installed and there is a unique key pair for each of those links. Like other nodes, monitor node 674 has a private and public key pair used for encrypting data sent to other nodes. The monitor node may be installed on the installation server 630 or on an independent computer and linked into the network. It is recommended that the monitor be maintained in a highly secure environment, preferably inside a secure room, and preferably on a machine on which the monitor is the only application. In other embodiments, there may be more than one monitor node per network, particularly if the network is segmented into subnetworks. In such a case, a subnetwork may have its own monitor node.

Figure 6B:
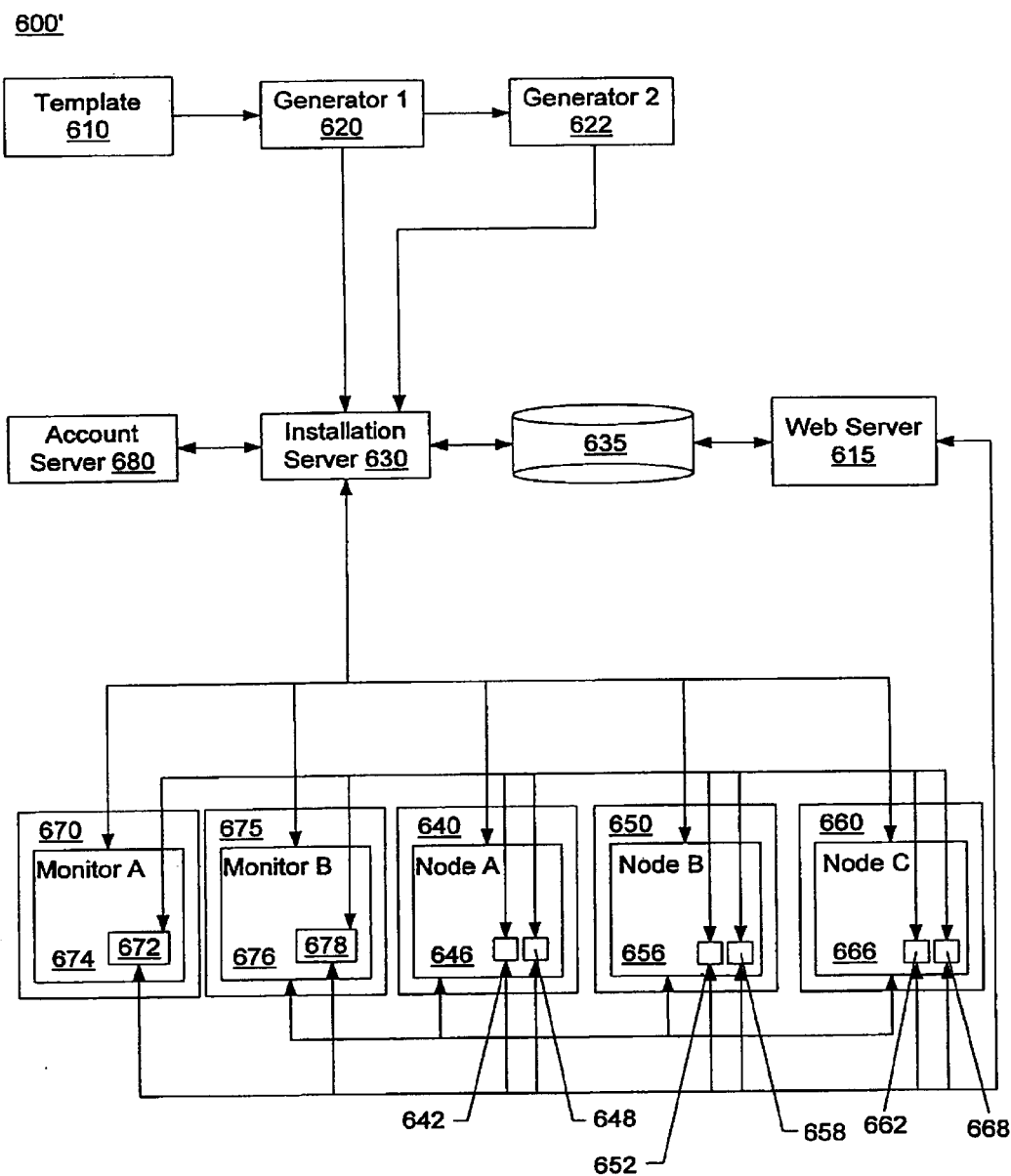
FIG. 6B is a block diagram of a system for generating and installing a private secure auditable network with automatic detection of possible interposed pirate nodes in accordance with the present invention.

A particular example of a network 600' with more than one monitor node is shown in FIG. 6B. In FIG. 6B, network 600' is shown with two monitor nodes, 674 and 676, located on separate secure machines 670 and 675. In this configuration, nodes 646, 656, and 666 will be monitored by monitor nodes 674 and 676. The connections between monitor node 674 and nodes 646, 656, and 676 are installed by agent modules 642, 652 and 662, respectively, which are generated by generator 620. The connections between monitor node 676 and nodes 646, 656, and 676 are installed by agent modules 648, 658 and 668, respectively, which are generated by generator 622. Generator 622 is located in a secure location that is separate from Generator 620. The two monitor nodes exchange information regarding the public keys that are in use between monitor node 674 and nodes 646, 656, and between the nodes themselves. Independent verification of the public keys in use on each side of a link allows for the detection of a pirate node that has been interposed in the link.

Generally, monitor node 674 monitors the status of the nodes from a security standpoint and may facilitate shut down all or part of the network in response to a security violation. Examples of security violations include the inability to decrypt a message received from another node or an attempt to install a node on more than one site. In such a case, tainted nodes are shut down nodes and the monitor node initiates reinstallation of nodes by installation server 630 to restore the network thereafter. To reestablish the network, the monitor node 674 also includes a link to generator 620 so that if monitor node 674 causes a node to be disconnected from the network due to a security violation, the monitor node can then task generator 620 to regenerate the node, or the entire network, if needed.

An account server 680 is linked to installation server 630 and monitor node 674, and keeps track of which nodes are installed in the network. Account server 680 may be used to keep such tracking with respect to certain clients, customers, organizations, departments, and so on, for a variety of purposes, including billing purposes. For example, account server 680 may generate bills (or invoices) to clients, as client's nodes enter the network during installation. The auditing nodes and capability previously described with respect to FIGS. 1 and 5 may also be added to the network. As part of the secure network, these auditing nodes employ the same password and encryption measures as other network nodes. As with previously described embodiments, the communication between nodes, between servers, and between servers and nodes may be accomplished using any of a variety of communication links and protocols, but is preferably accomplished using TCP/IP.

Figure 8:
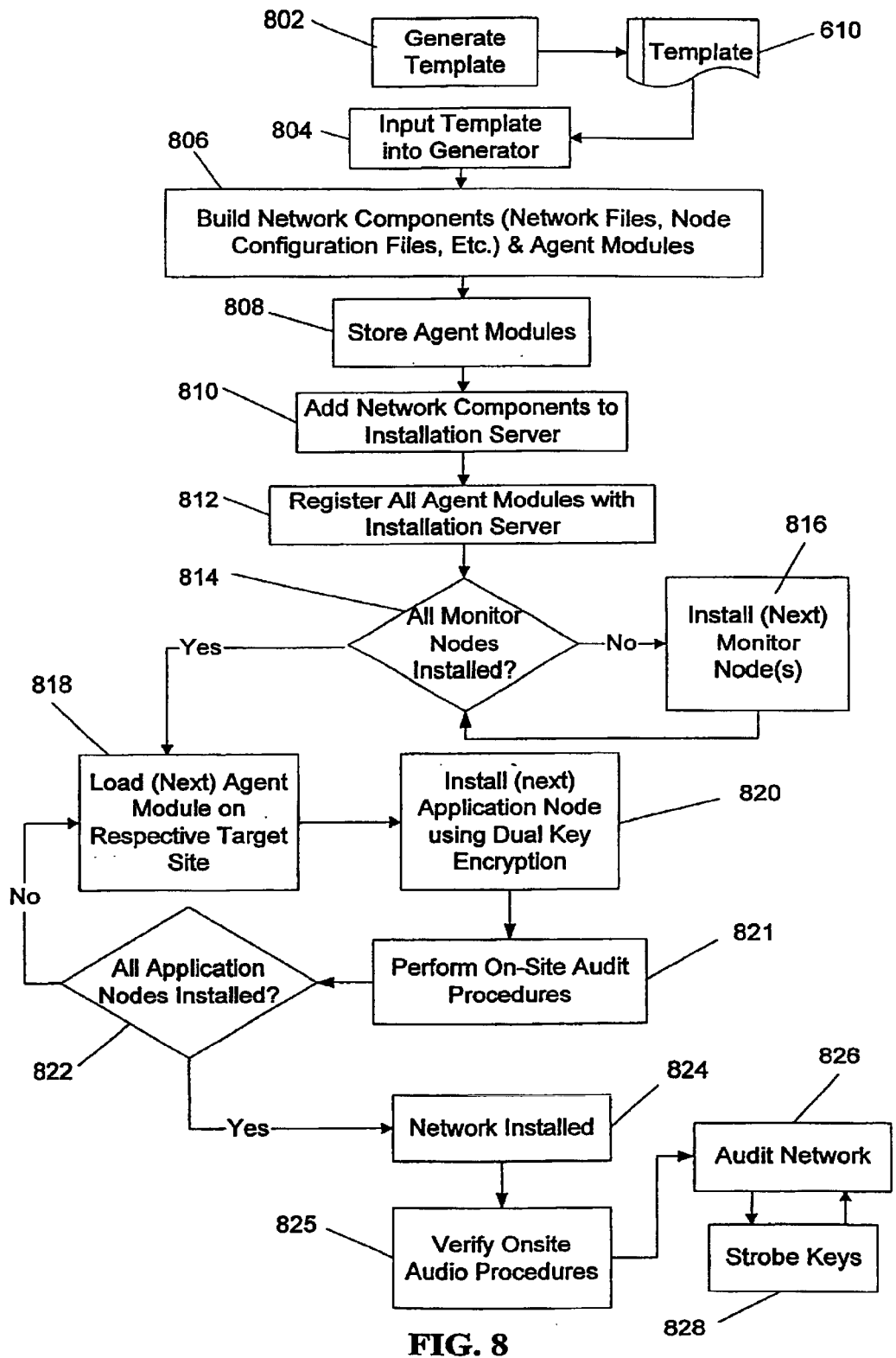
FIG. 8 is a top level method flow charts for generating and installing a private secure auditable network, using the system of FIG. 6.

Using system 600, a secure network may be generated and installed according to the methods described in FIGS. 8–13A, 13B and 13C. In FIG. 8, a top level method for generating and installing a secure network is described. In step 802, template 610 is generated in human readable form. In the example shown in FIG. 7, template 610 identifies five nodes by name 612, that is, nodes named Node A–Node E. As an example, the I.P. Address of Node A is 155.108.21.10 and application app_A is to be installed Node A. As previously mentioned, a monitor node must connect to all nodes. Therefore, it is not necessary to identify monitor links in the template 610 if there is only one monitor. In the two monitor configuration, Monitor B 676 is considered an application node with respect to Monitor A 674, and the link between Monitor A and Monitor B must be specified. In the two monitor node configurations, there is a second set of template entries (not shown) for Monitor B specifying the links between Monitor B and application nodes 646, 656, and 666, and additional sales and audit passwords for Monitor B and application nodes 646, 656, and 666. The software which runs the monitor node is generated by the generator, and is installed by an agent module (672 in FIG. 6A, 672 and 674 in FIG. 6B), generated by the generator 620 in FIG. 6A or by generators 620 and 622, respectively, as shown in FIG. 6B. The monitor node application software manages security of the network, manages the strobing of keys between nodes, determines and responds to security violations, and tasks generator 620 to regenerate nodes or the network. Continuing with Node A as an example, from FIG. 7 it is apparent that Node A links to Nodes B, C, and D, but not to Node E. Template 610 may be input, in step 804, into generator 620 in any one of a variety of known manners. In one embodiment, template 610 may by completed as a hardcopy paper version and input at a generator terminal (not shown) by keying or scanning it in. In another embodiment, template 610 may input from a remote computer via a standard Web browser and delivered to generator 620 via the Web.

Figure 9:
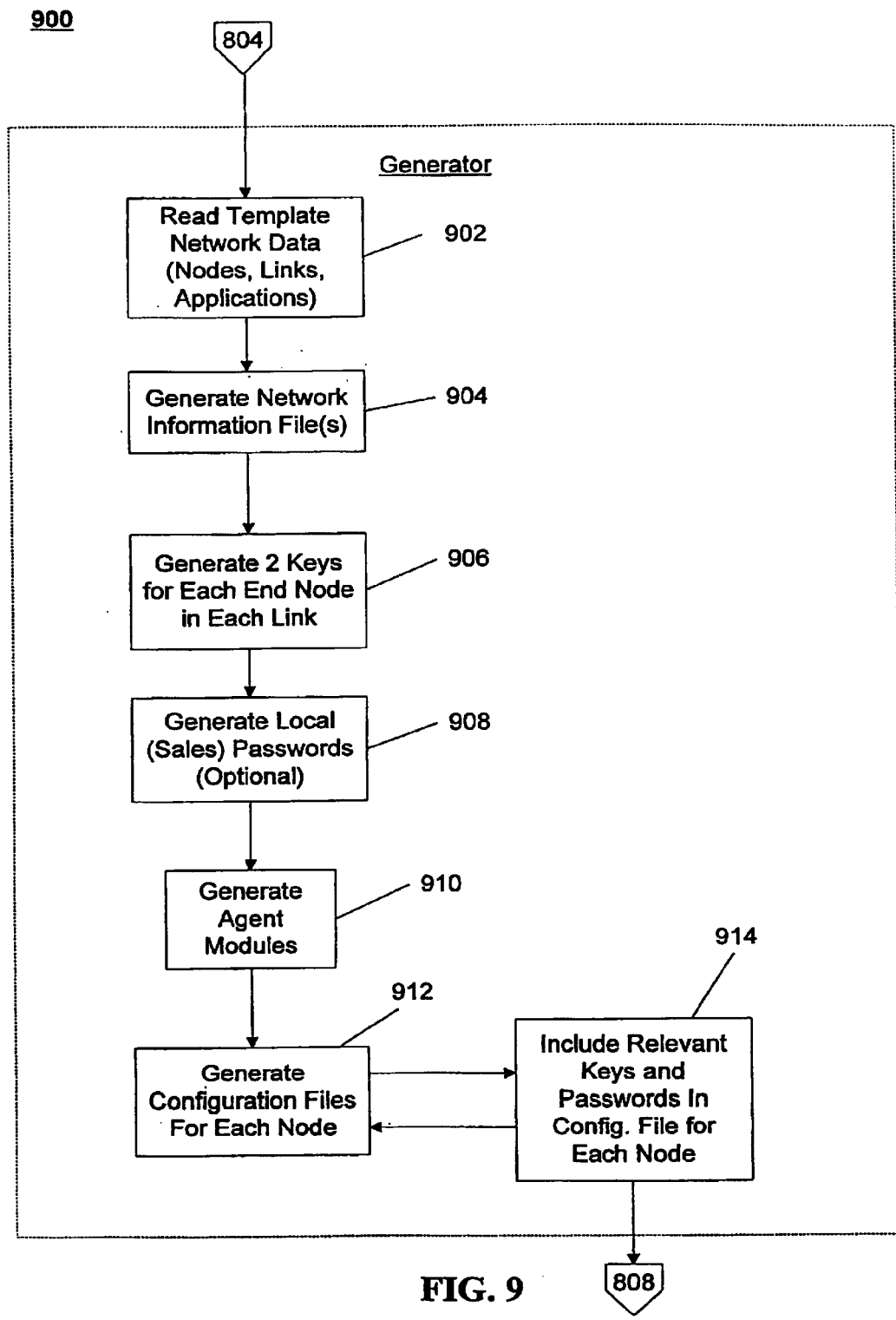
FIG. 9 is a method for generating network components, as part of the method of FIG. 8.

Based on the information in template 610, network generator 620 generates a group of network components in step 806 which, when loaded and executed, comprise the network. The preferred method 900 of performing step 806 is shown in FIG. 9. The information from template 610 is read, in step 902, by generator 620 to determine the composition of the network to be generated. In response, in step 904, generator 620 creates network information files which generally map the structure of the network, and include node and link identification information. A pair of dual login keys is created by generator 620 for each link in the network, in step 906. Each pair of keys is unique to a given link and each key of the pair corresponds to a different node (or direction of communication) in the given link. For example, from template 610, Node A is linked with Node B. A pair of keys for this link may include Key_AB for establishing a transmission path from Node A to Node B and Key_BA for establishing a transmission from Node B to Node A. For a communication session between Node A and Node B to be conducted, Node A is required to login to Node B by transmitting Key_AB to Node B and Node B must login to Node A by transmitting Key_BA to Node A. Once this dual login is complete, the communication session between Nodes A and B is commenced. These keys are kept hidden, that is, always encrypted, so that they never exist in human readable form in the software code. Consequently, even trusted technologically sophisticated individuals can not readily determine the keys for a link. These keys may be changed from time to time by the procedures for strobing the encryption keys, as described below and as shown in FIGS. 11, 12, 13A–13C.

Additionally, in optional step 908, generator 620 generates a local password for each node, wherein the download of node files is conditioned upon the timely input of the local password at the target site, transmission of the password to installation server 630, and verification of the password by the installation server. Each local password is a human readable string, preferably. In an embodiment where the node (and network) is being delivered to and installed by a first party (e.g., client) doing business with a second party (e.g., originator) which owns the system 600 for generating and installing a secure network, the local password may be a "sales" password issued to the originator's sales department and provided by the sales group to the client's group installing the network. The requirement for the verification of a separate local password to download node files, provided by a group which is independent of the group installing the network, substantially eliminates the possibility of one rogue group successfully installing a node on an unintended site. Therefore, the use of a local password at each node is preferred. A time limit may be incorporated into the installation server, such that if the local password is not entered at the target site within the time limit, installation is halted. The counting of time against the limit may begin from any predetermined point in the generation and installation process, for example from the completion of generation of the components.

In step 910, generator 620 generates a unique agent module for each node. Each agent module (e.g., agent module 642) includes information identifying its corresponding node (e.g., node name Node A and IP address 155.108.21.10) as well as information and functionality necessary to automatically connect to the installation server upon execution. The agent module will also include the "sales" password 617A generated in step 908. If this password is not entered at the terminal when the agent module attempts to perform an installation at the target site, the agent module will not operate. In step 912, generator 620 creates a node configuration file for each node. The node configuration file includes the node name, node address, hardware parameters, and link definitions associated with that node. The pair of unique and hidden keys used to enable communication between the link nodes, and described above, is also included, in step 914, in the node configuration files. Steps 904, 906, 908, 910, and 912 (and 914) may be performed in a different order, simultaneously, or intermittently. Upon completion of method 900, the process returns step 808.

In step 808, generator 620 stores each one of the agent modules into data storage device 635, where each agent module awaits transfer to its respective target site. The agent modules may be loaded into storage device 635 as they are generated or may be initially loaded in temporary storage (e.g., RAM) of the generator and then transferred to storage device 635. All of the application files, network information files, and node configuration files are stored at, or are made accessible by, installation server 630, in step 810. Since it needs to know where the agent modules are located in the network to install the network, the agent modules are "registered" with installation server 630, in step 812. That is, an identification and the predetermined target site location of each node's agent module is stored with installation server 630.

As part of steps 806 through 812, generator 620 also generates at least one monitor node 674, as defined by template 610. A monitor node is always the first node installed by the installation server, because the installation depends on the monitor node interacting with the node being installed. Monitor node 674 connects to each node as it enters the network, preferably strobes each nodes' keys after the node establishes communication with other predetermined nodes in the network, and monitors the network from a security standpoint. Consequently, in step 814 a test is performed to ensure that all monitor nodes (if there are more than one) are installed. If all monitor nodes are not installed, the next monitor node is installed, as depicted by step 816. In other embodiments, it may be required that only a first monitor node is installed and then any other monitor nodes need not be installed immediately after the installation of the first monitor node. A monitor node 674 is installed, with a monitor application, by loading a monitor node application on a predetermined target site and establishing communications with installation server 630.

In step 818, each agent module (e.g., agent modules 642, 652, and 662) is loaded on a preselected target site (e.g., target sites 640, 650, and 660, respectively) as shown in FIG. 6A. Agent modules produced by network generator 620 may be distributed to and loaded on their respective nodes in one of a variety of ways. As mentioned previously, the agent modules in storage device 635 may be linked to web server 615 and accessed via the Web. Alternatively, each module may be loaded onto a disk or CD ROM, physically delivered to its target site, and then loaded onto the target site. As another alternative, an agent module may be transferred using a generic file transfer capability and protocol (e.g., FTP) from a remote computer to its corresponding target site. As will be appreciated by those skilled in the art, various agent modules may be distributed and loaded in different manners.

Figure 10A:
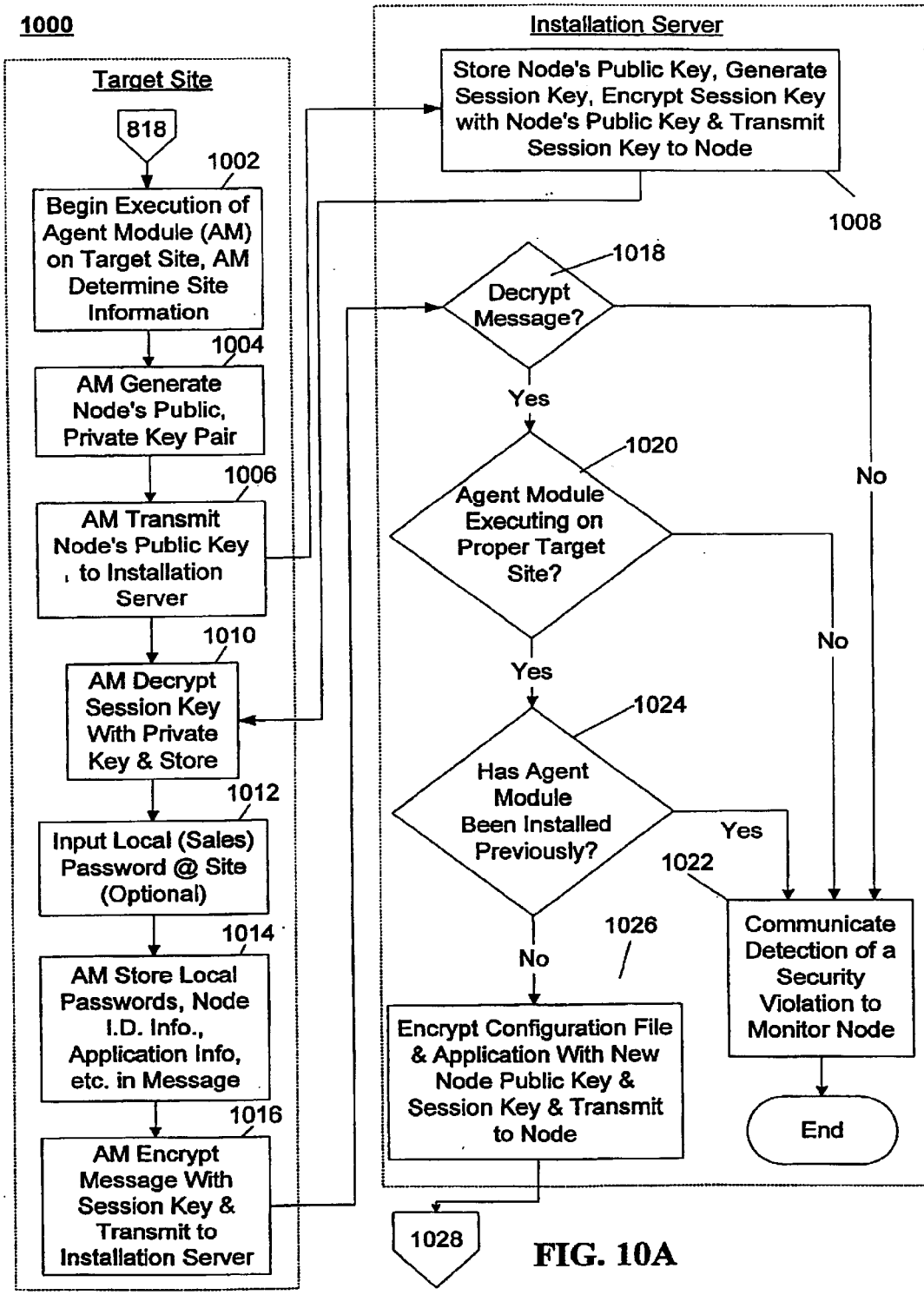
FIGS. 10–10C are method flow charts for installing application nodes, as part of the method of FIG. 8.
Figure 10B:
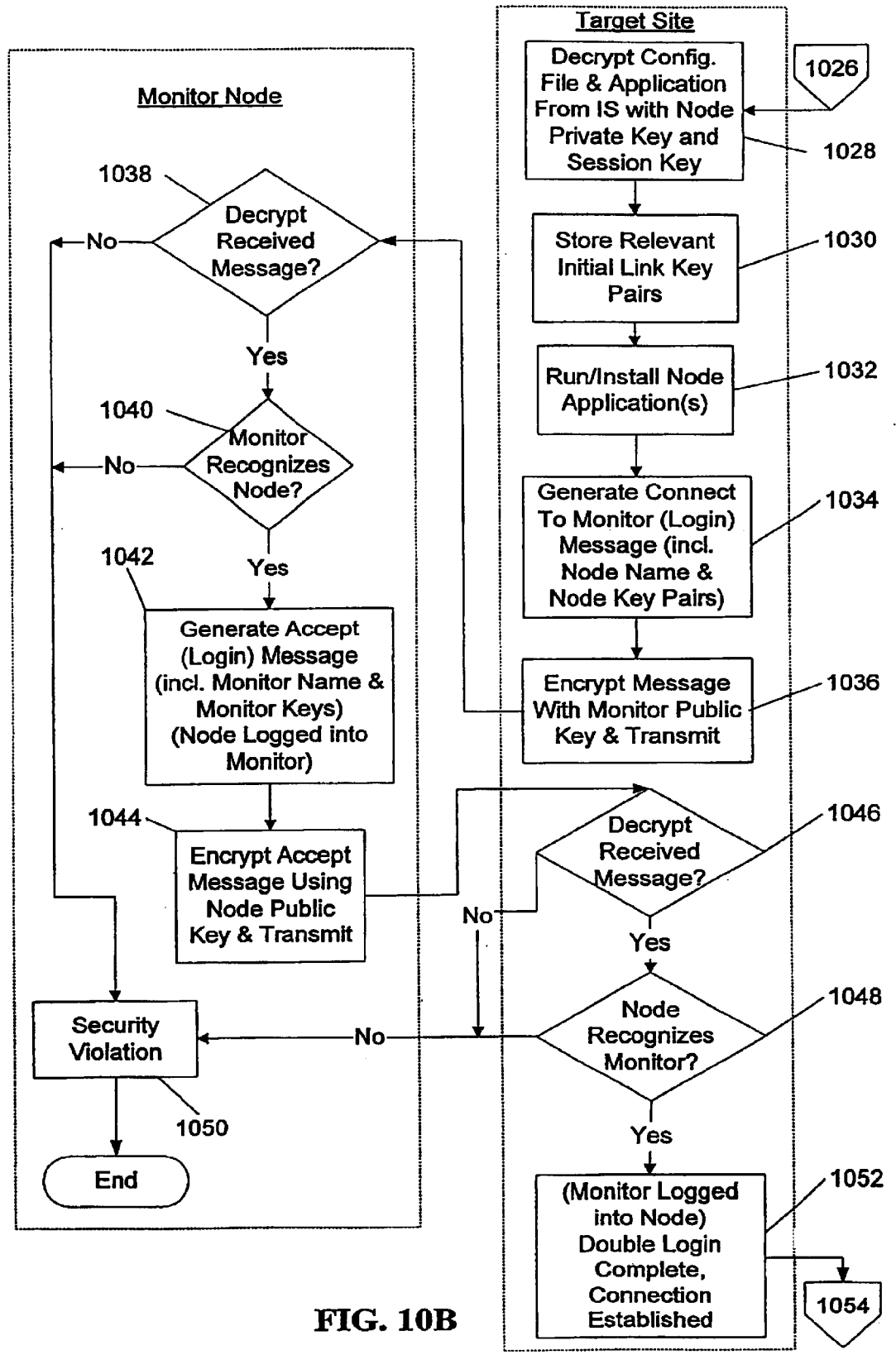
Figure 10C:
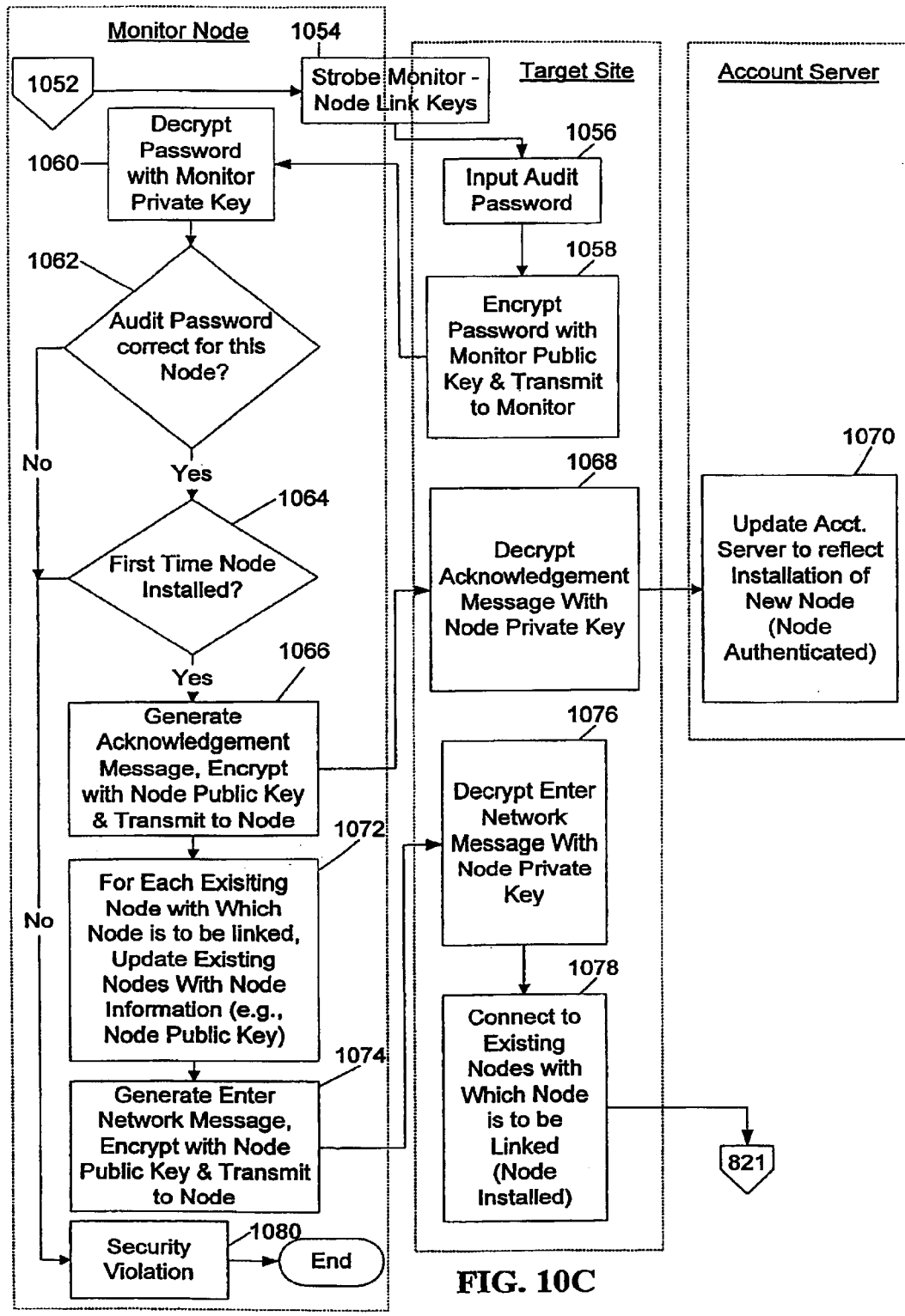

Once loaded on their respective target sites, installation of the nodes may commence, preferably according to process 1000 of FIGS. 10A, 10B, and 10C. In these figures, labeled, dashed line boxes encase the process steps performed by the various devices of FIG. 6A. When an agent module is initially executed on a target site the agent module knows how to communicate with the installation server 630. It is this communication capability which is required to download the necessary files needed to set up the node, including verification that it is the proper target site for that node. As shown in FIG. 10A, once an agent module (e.g., agent module 642) is loaded on a target site (e.g., site 640), the agent module is executed to initiate installation of the node (e.g., Node A 644) on the target site, in step 1002. During the execution, the agent module determines the I.P. Address and other relevant information (e.g., hardware configuration) relative to the site on which it is executing. As part of this execution, the agent module randomly generates the node's private and public key pair, in step 1004. The public key is derived from the private by known means, such as the RSA algorithm. The node's public key is transmitted to installation server 630, in step 1006.

In step 1008, installation server 630 responds by storing the node's public key, randomly generating a session key, and encrypting the session key with the node's public key. The installation server then transmits the encrypted session key to the node to complete step 1008. The agent module decrypts the session key with its private key and stores the session key in local memory, in step 1010. Installation server 630 and the node use the session key to encrypt subsequent communications between the two for the duration of the then current transaction. A new session key may be generated for each new transaction between two nodes or servers and exchanged as described above. If a local password has been generated for the node being installed, for example Node A, the installation pauses awaiting input of the local password at the target site and the local password is entered in step 1012. The agent module generates a message. containing the information gathered in step 1002 and the input local password in step 1014. The agent module, in step 1016, encrypts the message using the public key of installation server 630 and transmits the message to installation server 630.

If installation server 630 cannot decrypt the message, a security violation is detected in step 1018, a corresponding message is transmitted to monitor node 674, as shown by step 1022. If installation server 630 decrypts the message and determines that the local password and site identification information are consistent with the node information on installation server 630, in step 1020, then the installation server has verified that the agent module is installed on the proper target site. If this is not the case, a security violation is detected and communicated in accordance with step 1022. Assuming that the agent module is operating on the proper site, in step 1024 the installation server checks to determine whether that agent module as already performed a node installation and if so, a security violation is detected and communicated in accordance with step 1022. Otherwise, the installation server encrypts the configuration file and application corresponding to that node with that node's public key and the session key and transmits these files to the target site, in step 1026.

In step 1028 of FIG. 10B, the target site decrypts (using the session key and its private key) the node configuration file and application and begins to install the node on the target site accordingly. The node configuration file includes information as to which other nodes the node being installed can connect, and contains the initial encryption key pairs generated by generator 620 for each link for which it is an end point. These keys are stored at the target site in step 1030. In the preferred embodiment, the node configuration file also contains information regarding the configuration of the application to be installed and information regarding the other nodes with which it is to be linked, and communicates this information to the agent module as the node is being installed in step 1032. At this juncture, the activity between the node and installation server 630 is substantially complete, with all files required by the node having been downloaded to the target site.

As part of the installation of the node, the node must establish communication with the monitor node 674. The link between monitor node 674 and Node A (as an example) is similar to other links in the network, in that a pair of hidden keys was generated for this link by generator 620. Therefore, a key pair for this link may include key_AM corresponding to Node A's login to the monitor node and key_MA corresponding to the monitor's login to Node A. In step 1034 the node generates a "connect" message to initiate connection and login with monitor node 674. When the node is run on the target site, it includes a capability to automatically connect with the monitor node, such auto-connect capability is known in the art and will not be described in detail herein. The connect message generated in step 1034 includes information which will uniquely identify the Node A to the monitor node, such as the node name (i.e., Node A) and the node's hidden key (i.e., key_AM). The connect message is encrypted with the monitor node's public key and transmitted to the monitor node, in step 1036.

If monitor node 674 is unable to decrypt the connect message, in step 1038, it declares a security violation in step 1050 and may shut done the installation of the node. If it does decrypt the connect message, monitor node 674 reads the information in the message, including the node name and key, to determine if this information is consistent with the information stored at monitor node 674 corresponding to the node being installed, in step 1040. If the information is not consistent, a security violation is declared in step 1050. Otherwise, monitor node 674 recognizes the node being installed. Accordingly, in step 1042, the node is logged into monitor node 674 and the monitor node generates an "accept" message, which includes the monitor node's name and key. In step 1044, the monitor node encrypts the message with the node's public key and transmits the accept message to the node. Similar to the monitor node, the node, in steps 1046 and 1048, determines whether it can decrypt the accept message and whether it recognizes monitor node 674. If not, a security violation is declared in step 1050. Otherwise, the monitor node has logged into the node and the double login is complete, in step 1052.

Figure 11:
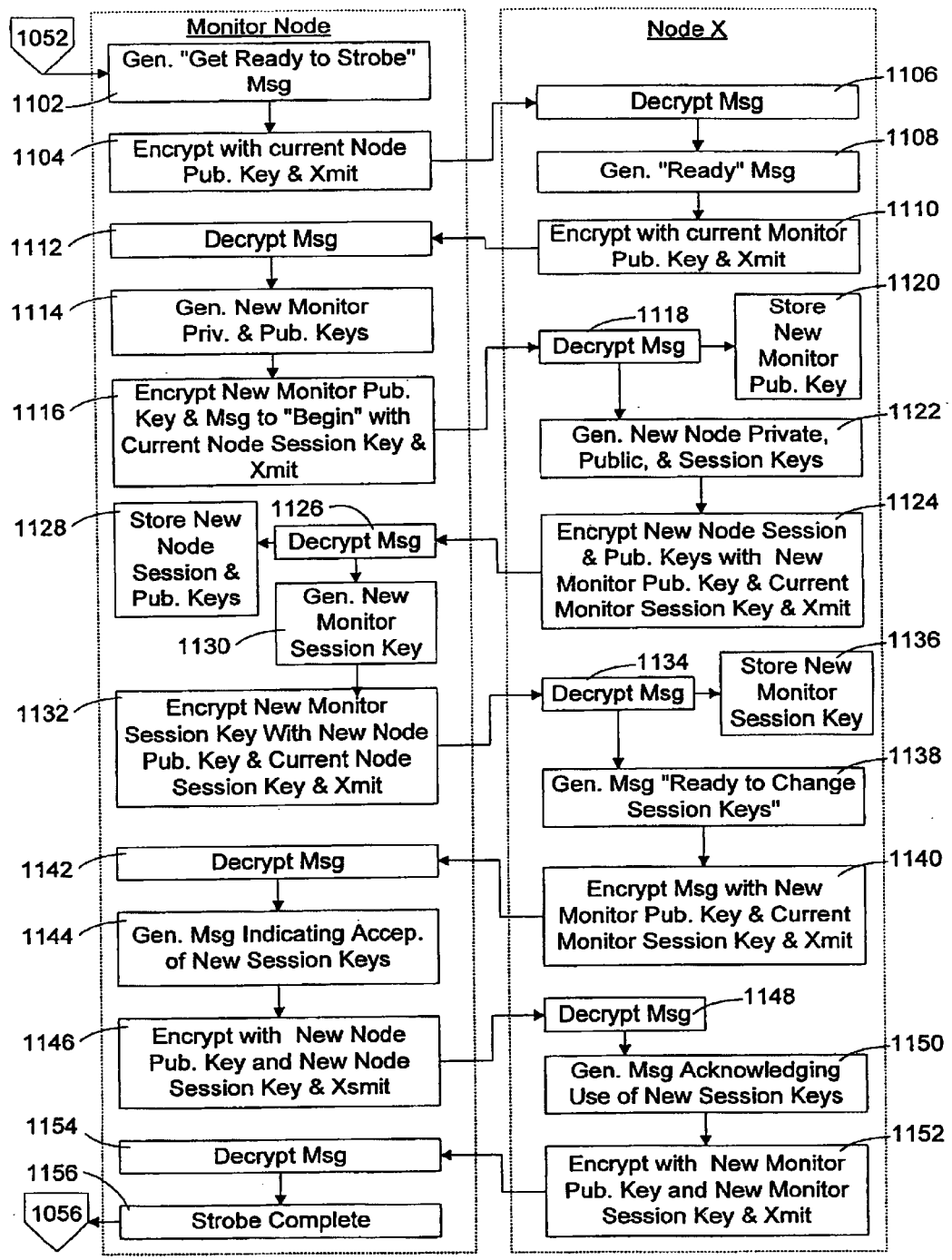
FIG. 11 is a method flow chart for the strobing keys between a monitor node of FIG. 6 and a node being installed, as part of the method of FIG. 10C.

Proceeding to step 1054 of FIG. 10C, the encryption keys of the monitor node—node link may be strobed. The preferred process for strobing between the monitor node and another node is shown in FIG. 11 and described ahead with respect thereto. In the preferred embodiment, as an additional security measure, an auditing password may be required to be input at the target site before the installation proceeds and the node is allowed into the network. In such a case, this auditing step preferably requires a human verification that the node is actually being installed physically on the proper target site. Ideally, the human is an auditor that is independent from the group installing the network and independent from the sales group from which the network was procured. Therefore, in step 1056, an auditor inputs an audit password at the target site, providing verification that the node is being installed on the proper target site. If such an audit step is not desired, the installation proceeds from step 1054 to step 1070 and step 1072. In step 1070, account server 680 is updated to reflect that the node is entering the network. In step 1072, as will be discussed, the node begins the process of connecting into the network.

Assuming that the auditing function and audit password are used, in step 1058, the input audit password is encrypted with the monitor node's public key and transmitted to the application node at the target site. The application node decrypts the password using the node's private key, in step 1060, and determines whether it recognizes the audit password in step 1062. If it does not, a security violation is declared in step 1080, else the process proceeds to step 1064. In step 1064, monitor node 674 performs another test to determine whether this is the first time this node has been installed. The test in step 1064 is preferred, but not essential. If such a test is included, the monitor node keeps track of each time an audit password is received from the node. Any audit passwords received after the first audit password for a given node causes a security violation to be declared in step 1080. If it is the first time the node is being installed, the monitor node generates an acknowledgment message, which it encrypts with the node's public key, and then transmits to the node, in step 1066. The node decrypts the message with the node's private key and provides an indication to notify the account server that the node is entering the network, in step 1070. As one example, the indication may take the form of a message electronically transmitted to account server 680 via the monitor node 674, installation server 630, or via some other path. Alternatively, as another example, the indication may be generated at the target site and communicated via voice or hardcopy means to a party having access to account server 680.

Upon generating the acknowledgment in step 1066, or in parallel therewith, the monitor node 674 communicates with each other node in the network to which the node being installed is to be linked, and updates the other nodes with information relating to the node being installed to prepare the other nodes to connect with the node being installed, in step 1072. Such information may include, for example, node identification information and the current public key of the node. Monitor node 674 also generates a message prompting the node to enter the network, in step 1074. The message may include information about the other nodes with which the node is about to connect (e.g., I.D.s and current public keys of each node). This message is encrypted with the node's public key, also in step 1074, and transmitted to the node. In step 1076, the node decrypts the message with its private key. The node then establishes a connection with each other link, in step 1078, according to the definitions in template 610 and using the node's passwords for each of those links. This connection between nodes is accomplished in a substantially similar manner, using the dual login approach, as the connection between monitor node 674 and the node being installed, in steps 1034 through 1052 in FIG. 10B. Once the node connects with the other nodes in the network, the installation of the node is complete, as indicated in step 1078, and the process returns to step 821 of FIG. 8.

Figure 17:
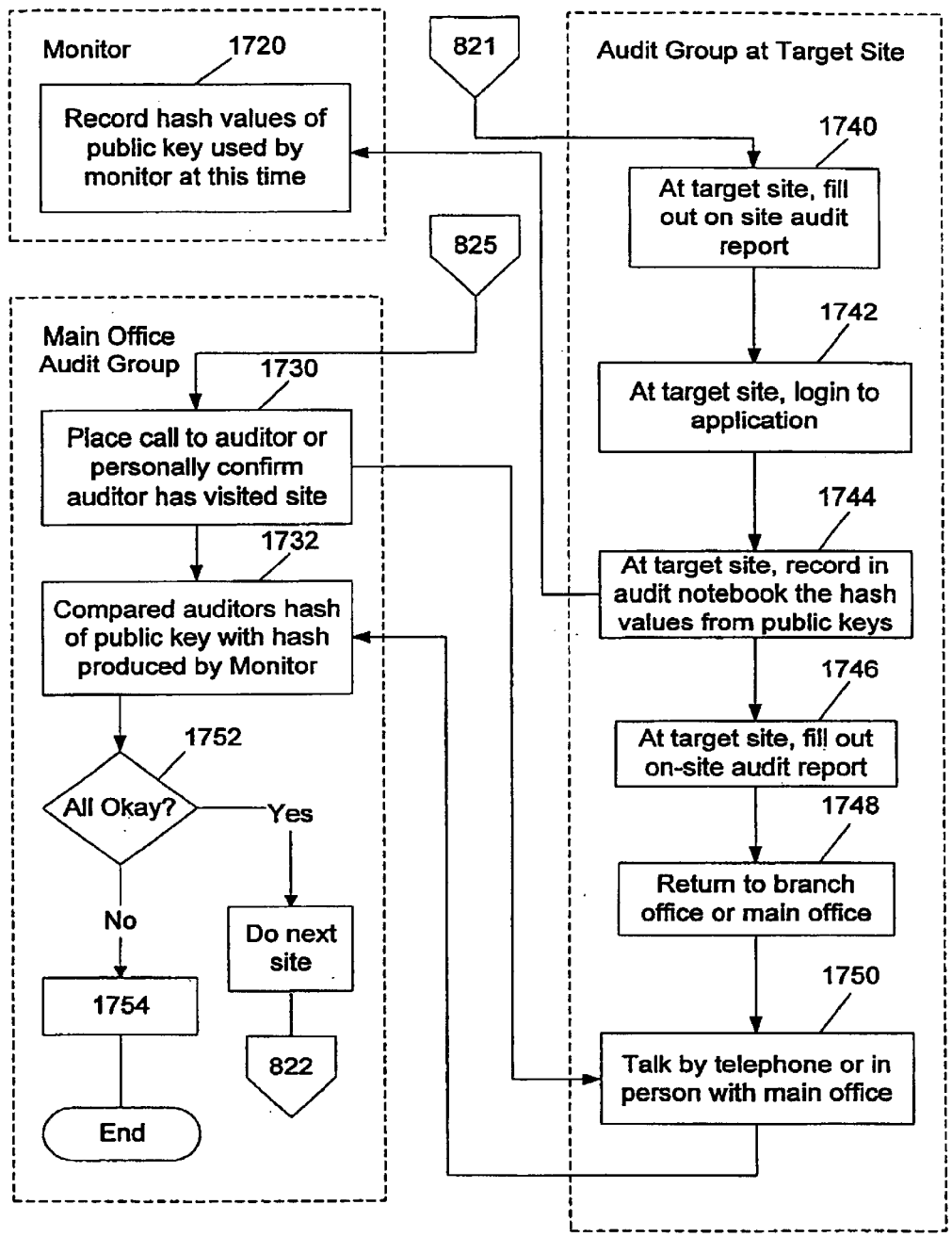
FIG. 17 is a method flow chart of an installation audit procedure in accordance with the present invention.

The installation auditing process shown in FIG. 17 is similar to traditional on-site auditing of physical objects performed by an auditor, but adapted to a network installation. The auditor visits the location where the node is running, step 1740 and records this information in an audit workbook, step 1746, for example. At the target site, the auditor logs into the application, step 1742. This login is recorded by the monitor node in step 1720. The application presents to the auditor, in a window on the screen, a human recordable hash of the Monitor public key currently in use by the application. The auditor records this hash in an audit workbook, step 1744. The monitor node also makes a separate record of this hash in step 1720. The monitor node and the on-site auditor could also record hashes for a series of public keys to ensure that a valid comparison will be possible. The auditor then returns to office, step 1748, where the auditor is called by the main office. Alternatively, the auditor personally visits the main office, step 1730. These procedures to audit the node are deliberately not performed with software and are a significant protection against software attack by a pirate. Human contact is intentionally introduced into a computerized system.

The hash for the monitor node public key and the hash produced on the target site by the application are compared in step 1732. If they are not the same, in step 1752, this indicates that a pirate has interposed itself between the application and the monitor node. This is a security violation, step 1754. The network is then closed (or shutdown) and reinstalled. If they are the same, the process continues to step 822.

In step 822 of FIG. 8, installation server 630 performs a check to determine whether all of the nodes in the network (i.e., defined in template 610) have been installed. If all the nodes have not been installed, the process returns to step 818, wherein the next agent module is loaded on a target site and the process of installing a node follows the process of FIG. 10A–10C. Once all of the nodes have been installed into the network, as depicted by step 824, the network is installed.

An additional auditing capability may be included in step 826, because one prominent danger in a secure network is that a pirate, possibly an insider, could introduce software into a node that would allow the pirate to install software remotely or to issue commands remotely, in other words, to "break into" the remote system and perform unauthorized activities. The installed network software will presumably be very large, consisting of thousands of lines of code. Therefore, it would be practically impossible to perform a software audit to determine what the software does. Rather, auditable nodes can be installed between parts of the secure network for the purpose of auditing data. Preferably, if auditable nodes are included in the network, they handle only a small amount of code, which is audited using the techniques described previously with respect to FIGS. 1–5. For these nodes, auditors would examine the code and watch the build of software as it takes place, rather than auditing the entire configured network. These auditable nodes examine all incoming packages against predetermined criteria, and pass the conforming packages on to the rest of the network. The auditable nodes are similar to other nodes in the network, in that they implement the same password and encryption schemes described previously. Accordingly, the data is decrypted coming into an auditable node and encrypted going out of the node, after the appropriate examination. Since installation server 630 does not, ideally, contain any customer data, other than the very limited data needed to perform the installation, the installation server 630 can also be audited against criteria using the techniques set forth with respect to FIGS. 1–5. The auditing of the network in step 826 is presumably an ongoing task, which is performed as the network is being installed, and while the network is up and running.

In step 828, the encryption keys for each link are strobed. As discussed briefly with respect to step 1054 of FIG. 10C, the monitor and a node being installed may strobe their keys. The process of accomplishing the strobing of keys between the monitor and a node is described in FIG. 11. This process may be used while the node is being installed and at any time after the node is up and running in the network. As with previous figures, the dashed line boxes around the process steps and the node labels corresponding to the boxes indicate which node is accomplishing the individual steps. In step 1102, monitor node 674 generates a "get ready to strobe" message. This message in encrypted in step 1104 with the current node public key and transmitted to the node. In step 1106, the node decrypts this message with its private key. In response, in step 1108, the node generates a "ready" message which is encrypted with the monitor's public key and transmitted in step 1110. In step 1112, monitor node 674 decrypts the message with its private key and generates a new monitor node private key, by a random generation process and derives a public key from the new private key, in step 1114. In step 1116, the monitor node encrypts its new public key and a message to "begin" the strobe with the node's current session key and transmits this message to the node. In step 1118, the node decrypts the message with its corresponding session key and stores the new monitor node public key, in step 1120. In step 1122, the node responds by generating a new node private key, deriving a new public key, and also generating a new node session key. The new session key and public key are encrypted with the new monitor node public key and the current session key and transmitted in step 1124 to the monitor node.

Monitor node 674 decrypts this message with its session key and the monitor node's current private key, in step 1126, and stores the new node public key and session key in memory, in step 1128. In step 1130, monitor node 674 generates a new monitor session key. The monitor session key is encrypted with the new node public key and the current node session key and transmitted back to the node in step 1132. The node decrypts the message, in step 1134, and stores the new monitor session key, in step 1136. In step 1138, the node generates a "ready to change session keys" message. This message is encrypted with the new monitor public key and the current monitor session key, in step 1140, and transmitted to monitor node 674. The monitor node decrypts the message, in step 1142, and generates a message indicating the acceptance of the new session keys, in step 1144. In step 1146, the monitor node encrypts the new node public key and the new node session key and transmits the message to the node, where it is decrypted in step 1148. The node then generates an acknowledgment message indicating that it is ready to use the new session keys, in step 1150. The node encrypts this message with the new monitor public key and the new monitor session key and transmits the message to monitor node 674, in step 1152. In step 1154, the monitor node decrypts the message and, as indicated in step 1156, the strobing of keys is complete.

Figure 12:
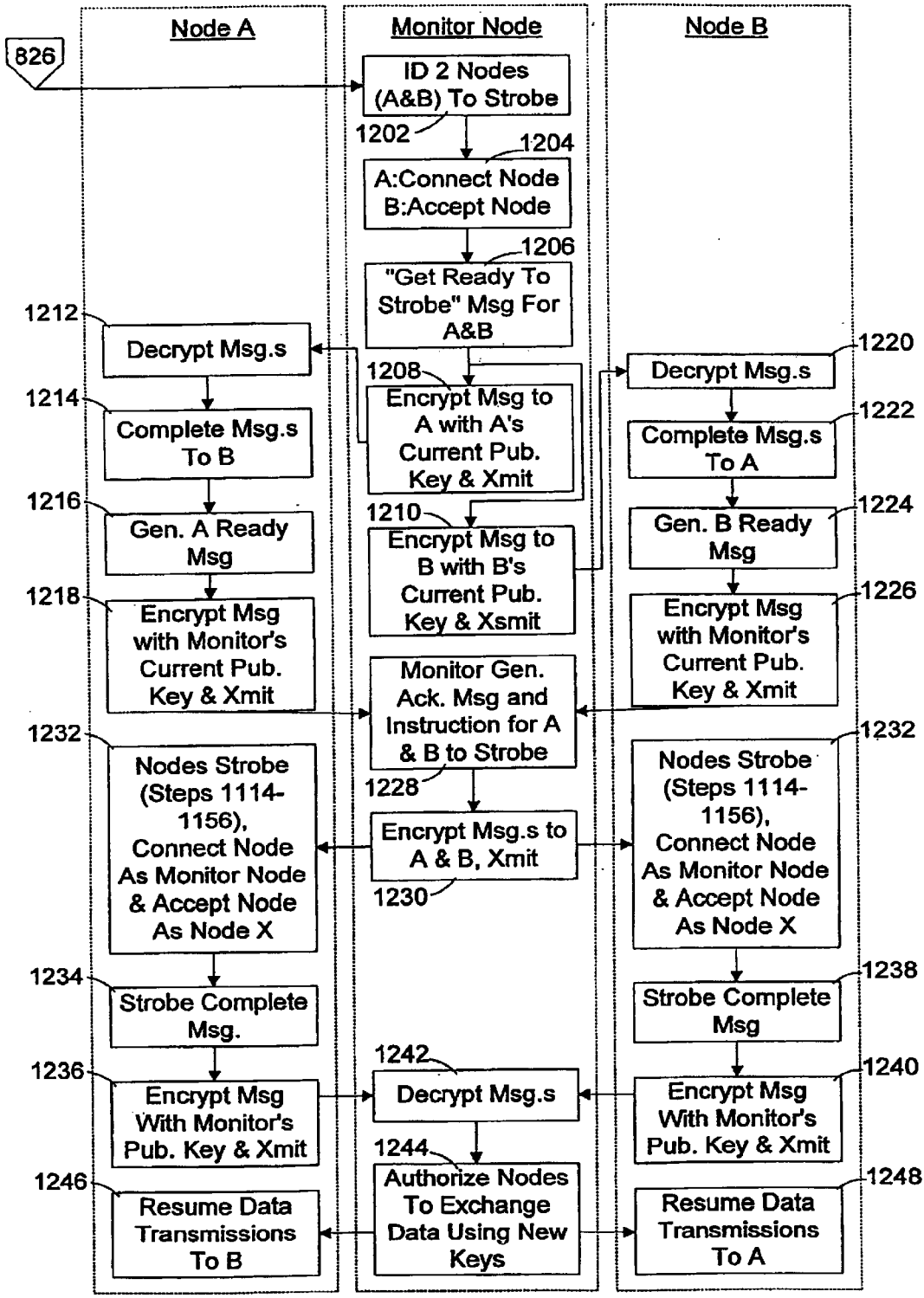
FIG. 12 is a method flow chart for the strobing of keys between two nodes, as part of the method of FIG. 8.

The process 1200 for strobing keys between two nodes, wherein one of the nodes is not monitor node 674, is described in FIG. 12. The strobing of keys between two nodes may be initiated while the nodes are sending other data (e.g., business data) to one another. In such a case, the nodes will safely coordinate key strobing with data transmission. To accomplish this, the nodes implement a thread-based strobing protocol, wherein data transmissions are ceased or "blocked" to allow strobing to occur. A thread is a unit of execution within an application which executes by itself. An application (or node) typically has several threads, and typically maintains a thread for receiving data from each other node to which it is connected, and maintains another thread to send data. The same thread could be used to send data to different nodes. When two nodes exchange data, the data is encrypted using the keys that have been established between the two nodes. Strobing involves changing these keys. In one embodiment, in order for strobing to occur, it is necessary that, while a strobe operation is underway, the nodes between which the strobing is taking place, send only strobe data to one another, and that they not send business data or any other data to one another. The keys have to be properly reestablished in order for the flow of business data to recommence.

To initiate a strobe between two (non-monitor) nodes, the monitor node 674 and nodes to be strobed implement process 1200 of FIG. 12. In step 1202, the monitor node identifies two linked nodes, as an example Nodes A and B, to strobe. In step 1204, one of the two nodes, in this case Node A, is designated as the "connect" node and the other node, in this case Node B, is designated as the "accept" node. Monitor node 674 generates a "get ready to strobe" message (e.g., STROBE_GET_READY) for each node in step 1206. In step 1208, this message is encrypted with node A's current public key and transmitted to Node A. In step 1212, Node A decrypts this message with its private key, and completes the transmission of current messages to Node B, in step 1214.

Two nodes (or applications) sending data to one another may have dozens of different messages pending for one another, so control must be applied in step 1214. In order to be able to issue a STROBE_READY message to monitor node 674 (i.e., complete transmissions), nodes impose order on the messages they send to one another, preferably by the following method. The nodes order their messages into a small number of top level messages, say six messages are pending, for example. Subsidiary messages are included as options within top level messages. The top level pending request messages are given even numbers, say 100, 102, 104, 106,108, and 110. A response to a request message is given an odd number, one greater than its corresponding request message. In an object oriented context, a synchronization object is created for every top level message. These are referred to as message synchronization objects. By using a scheme of even messages for requests, odd messages for responses, and a message synchronization object for every request message, a node, when it receives a message, can immediately calculate whether the message is a request or a response and the index number of the corresponding message synchronization object. Assuming message "B" is the first message for a series of top level messages, "M" is the message number of the top level message, and "I" is an index beginning at zero for a series of message synchronization objects. Then a message is a request if M %2 is zero and it is a response if M %2 is one. (The % is modulus operator.) Further, the index I can be calculated:

$$I=(M-B)/2-M\ \%2$$

A "sending" thread initiates a request message, and it must wait until a response is received to initiate another request. Imposing an organizational scheme, such as the scheme revealed above, allows a strobe to safely occur between any two nodes in the network. That is, using the index and message numbers, a message can be held and, therefore, subsequent messages are also held. A target synchronization object is created for every other node with which the node is connected. A target synchronization object will pass through a "wait" if the object is signaled. Immediately after an object has passed through a "wait" it is set to non-signaled. When a thread has passed through a "wait", thereby setting the synchronization object to non-signaled, it is said to have "acquired" the object. Waiting for a target synchronization object means waiting until the object has become signaled, which passes the object through the "wait," and then immediately setting the object to non-signaled.

A node issuing a data request to another node: (a) waits for the target synchronization object for the other node; (b) chooses an appropriate message and sends the message; (c) waits for the message synchronization object; and (d) sets the target synchronization object to signaled. A receiving thread in the node will set the message synchronization object to signaled when the response is received. Thus, the sending thread will wait between steps (b) and (c), until a response to the message is received. When a STROBE_GET_READY message is received from monitor node 674, the node waits for the target synchronization object from the monitor node. A STROBE_READY is not returned to the monitor node until the target synchronization object has been acquired. When the application passes through this "wait," and acquires the target synchronization object, the sending thread will wait at step (a) above. Thus, while a strobe is in progress, the sending thread will wait at (a). Ultimately, when monitor node 674 sends a message indicating the strobe is complete (e.g., STROBE_DONE), the node sets the target synchronization thread to "signaled", and the send thread will be released to move beyond (a).

In order for strobing to occur, it is not necessary that requests be even and responses be odd, but only that the nodes wait for a response to each message in order to be able to assure that the data path between the two strobing nodes is clear of business data. However, the even/odd scheme described herein is a very convenient way to implement this functionality. A variation would be to require the request be divisible by three, thereby allowing two different responses, and so on.

Once each node has ceased data transmission, Node A generates a "ready to strobe" message (e.g., STROBE_READY) in step 1216 in FIG. 12. In step 1218, Node A encrypts this message with the monitor node's current public key and transmits it to monitor node 674. Similarly, in step 1210, the "get ready to strobe" message for Node B generated in step 1206 by the monitor node is encrypted with the Node B's current public key and transmitted to Node B. Node B decrypts this message with its private key in step 1220, completes the transmission of any current messages to Node A in step 1222, and generates a "ready to strobe" message, in step 1224. In step 1226, Node B encrypts this message with the monitor node's current public key and transmits the message to the monitor node. Upon receipt of both "ready to strobe" messages from Node A and Node B, monitor node 674 generates an "acknowledgment" message and instructions for Node A and Node B to strobe (e.g., STROBE_START message), in step 1228. The monitor node encrypts the message to Node A with Node A's public key and transmits it to Node A, and encrypts the message to Node B with Node B's public key and transmits it to Node B.

In step 1230, Nodes A and B conduct a strobe according to steps 1114 through 1156 of FIG. 11, wherein the "connect" node assumes the role of the monitor node and the "accept" node assumes the role of Node X in FIG. 11. In step 1232, Node A generates a "strobe complete" message and encrypts the message with the monitor node's public key and transmits this message to monitor node 674, in step 1234. Similarly, in step 1238, Node B generates a "strobe complete" message, and encrypts this message with the monitor node's public key and transmits the message, in step 1240, to monitor node 674. In step 1242, the monitor node decrypts the messages received from Node A and Node B. Monitor node 674 then authorizes Nodes A and B to exchange data using the new keys, in step 1244. Authorization to transmit data is communicated to each node and in steps 1246 and 1248, and the nodes resume data transmission. Once the strobe between the two nodes is complete, monitor node 674 waits for some time, and chooses another node pair to strobe. Monitor node 674 can assign priorities, and cause certain node pairs to strobe more frequently than others.

Figure 13A:
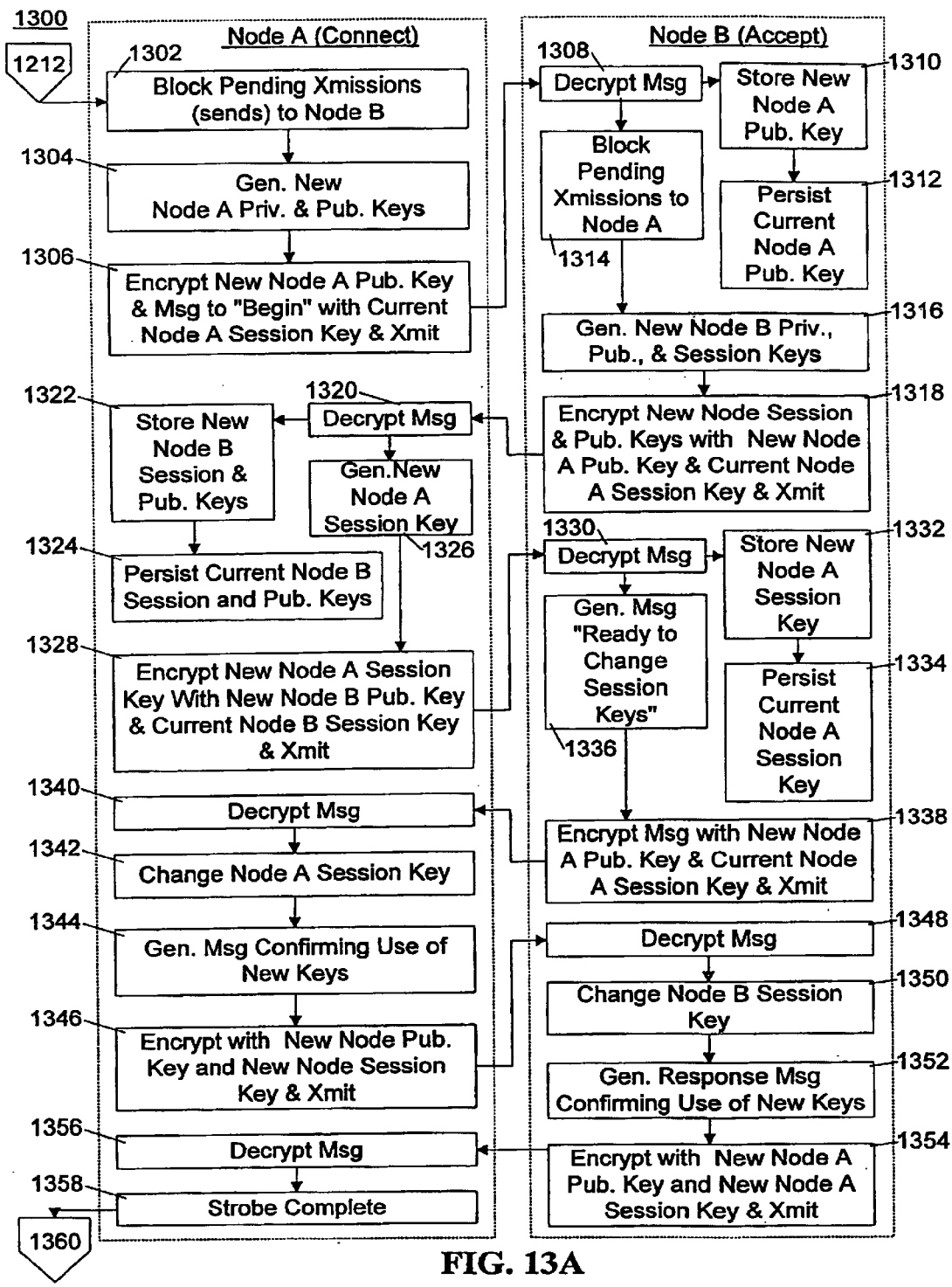
FIGS. 13A–C are flow charts for strobing keys with persistence, as part of the method of FIG. 8.
Figure 13B:
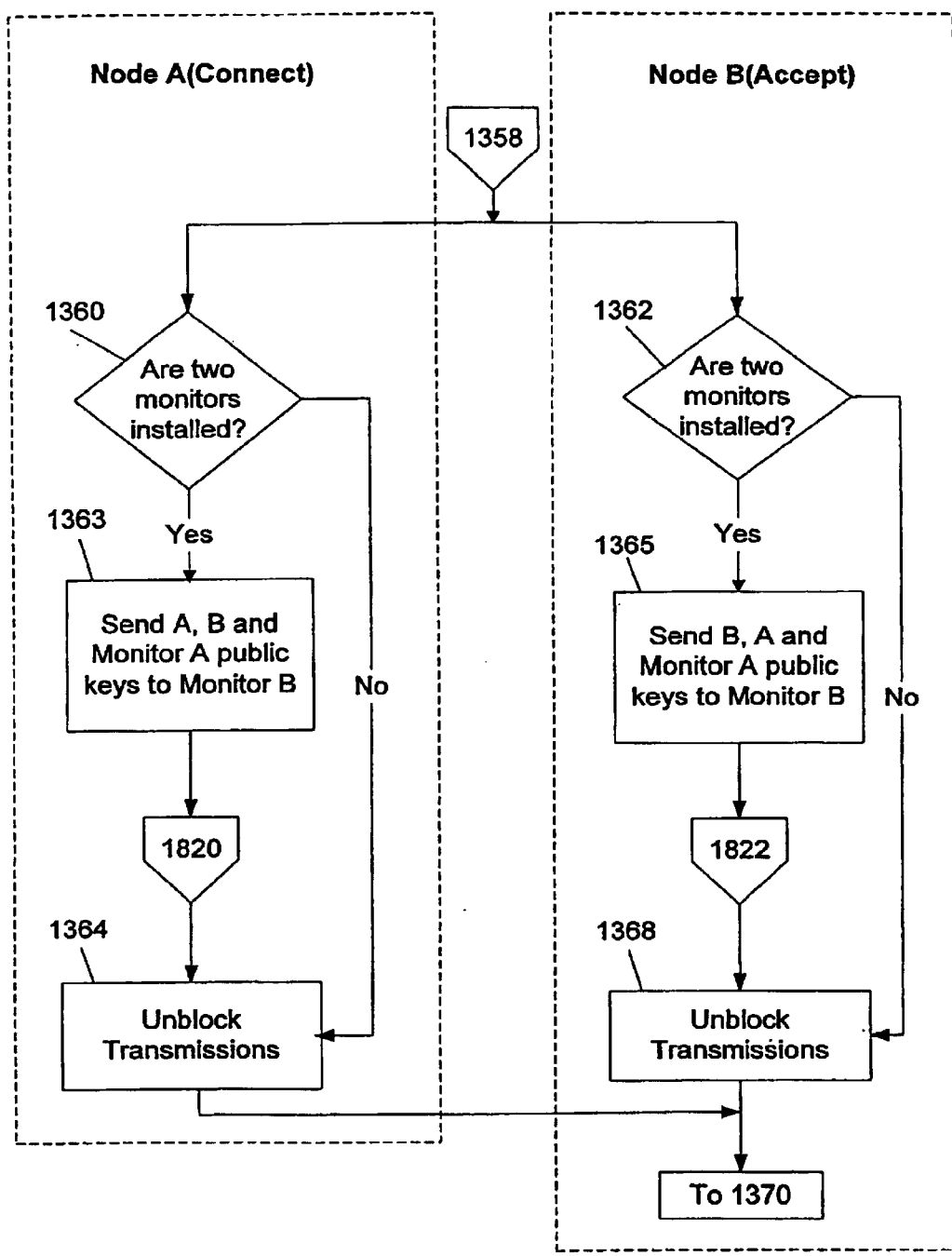
Figure 18:
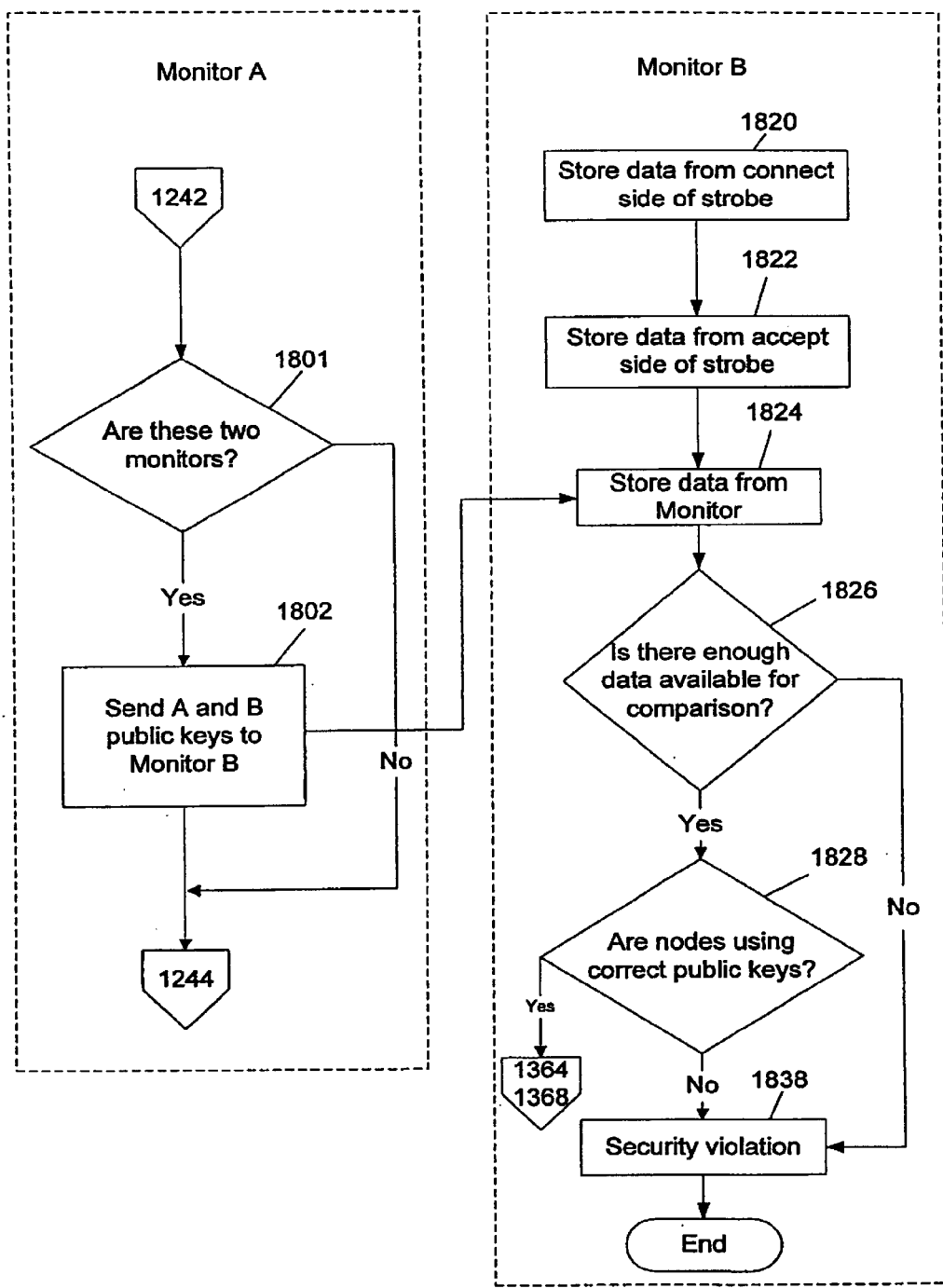
FIG. 18 is a method flow chart of a dual monitor audit procedure in accordance with the present invention.

If two monitors are used, steps 1246 and 1248 are appropriate points to send control information to Monitor B, the second monitor node 676 (see FIG. 13B and 18). The information that is important are the public keys that are in use by the various nodes at a particular time. If a pirate has interposed itself, it will have to provide its public key, have data sent to the pirate public key, decrypt the data, and reencrypt the data with a valid public key of the actual destination of the data. Thus, the comparing of the public key in use by a node with the required public key of the target facilitates detection of the interposition of a pirate. The data sent to the second monitor node 676 will also have a time stamp to facilitate comparison. The applications and the monitor node 676 could record hash values for a series of public keys to ensure that a valid comparison will be possible.

The monitor node 676 also records its version of what its public key should with respect to nodes A and B 1243. When the information is available, 1826, Monitor B compares what each node believes the public key of the other to be and what each node believes the public key of monitor node 676 to be 1828. If these values do not match, a security violation is declared, 1830, and the network (or a portion thereof) is closed.

Figure 13C:
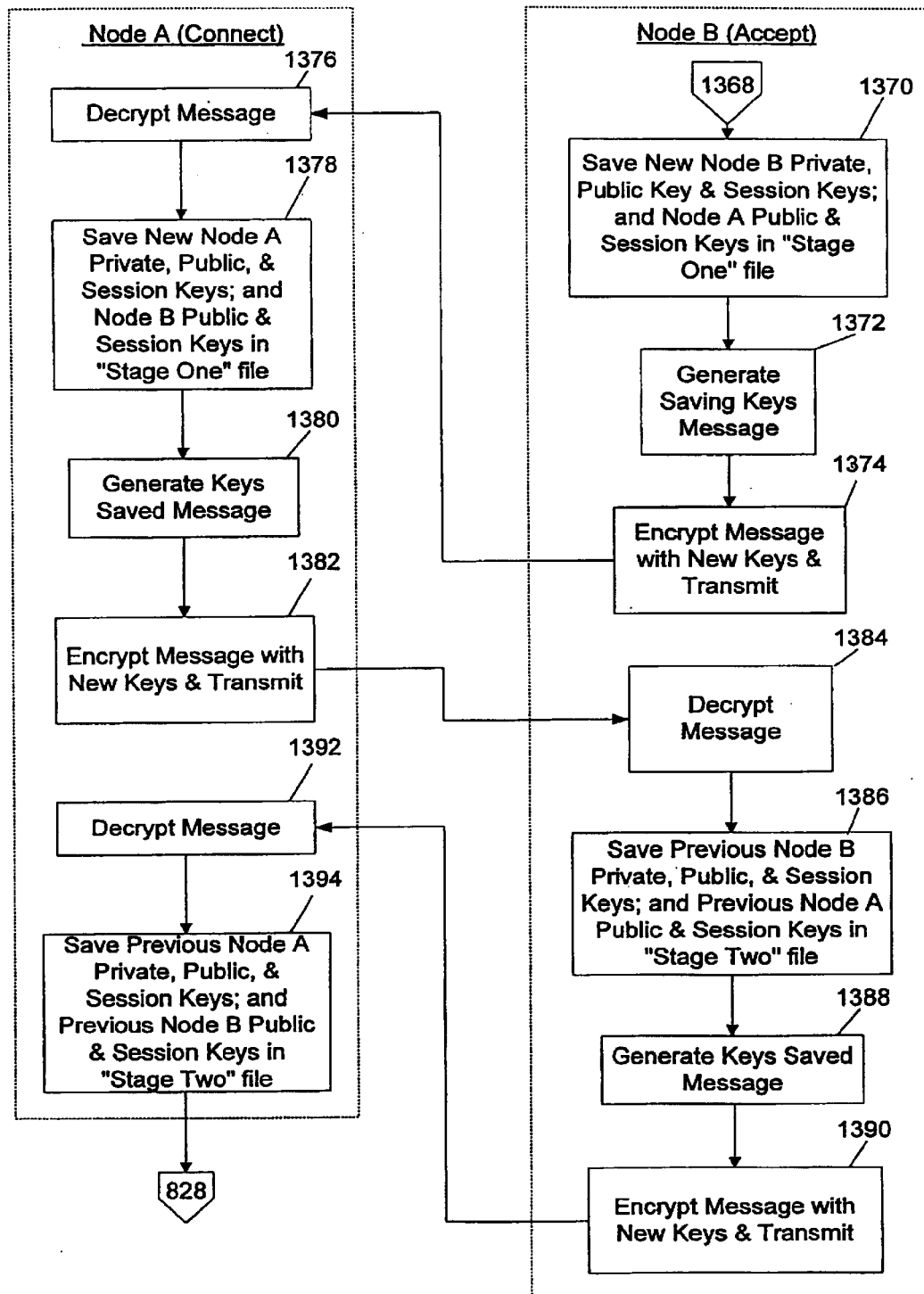

In some situations, the network or a node of the network may "come down" (i.e., go off-line). In another embodiment of system 600 and strobing, the network is able to recover in a state compatible with the last strobe. Recovery to a prior state is referred to as "persistence". The process for strobing with persistence 1300, is shown in FIGS. 13A–13C. Like process 1200, process 1300 is thread-based. That is, in order for strobing to occur while a node (or application) is also sending and receiving data, the node should maintain a separate thread to handle the transmission and receipt of data with other nodes. This thread is referred to as the "work thread". The thread in which the node strobing occurs is referred to as the "main thread". In order for strobing to occur, the work thread must be prevented from sending data over the connection to the other node while the strobing operation with its node is in progress. Preventing the work thread from sending data is referred to as "blocking", as previously described.

For the most part, process 1300 is similar to process 1200 for strobing between two nodes, with the addition the ability to recover after the network or a network node goes down. Referring to top level process 800 in FIG. 8, strobing process 1300 relates to step 828 "strobe keys". Process 1300 begins after monitor node 674 has selected two nodes to strobe, that is, steps 1202 through 1212 of FIG. 12, and terminates once the strobe is completed at step 828 of FIG. 8. Once a connect node, in this case Node A, and an accept node, in this case Node B, have been designated, and the nodes have received the "get ready to strobe" message from monitor node 674, the connect node blocks pending transmissions to Node B in step 1302. The connect node then generates a new Node A private and public key pair, in step 1304. In step 1306, Node A encrypts the new public key and a message to begin the strobe with the current Node A sessions key and transmits the message to Node B. Node B decrypts the message, in step 1308, and stores the new Node A public key step 1310. Node B also persists the current Node A public key in step 1312.

In step 1314, Node B blocks pending transmissions to Node A. Node B then generates a new Node B private and public key pair and a new Node B session key, in step 1316. In step 1318, Node B encrypts the new Node B session key and public key with the new Node A public key and the current Node A session key, and transmits the message to Node A. Node A decrypts the message in step 1320, and stores the new Node B session and public keys in memory, in step 1322. Node A also persists, or saves, the current Node B session key and public key, in step 1324. Node A also generates a new Node A session key in step 1326. The new Node A session key is encrypted with the new Node B public key and the current Node B session key and transmitted to Node B, in step 1328. Node B, in step 1330, decrypts the message and stores, in step 1332, the new Node A session key.

In step 1334, Node B also persists the current Node A session key. In step 1336, Node B generates a message indicating that it is ready to change session keys. This message, in step 1338, is encrypted with the new Node A public key and the current Node A session key, and transmitted to Node B. In step 1340, Node A decrypts the message and, in step 1342, Node A changes session keys to Node A's new session key. In step 1344, Node A generates a message confirming the use of the new keys. Then, in step 1346, Node A encrypts this message with the new Node B public key and new Node B session key and transmits the message to Node B. Node B, in step 1348, decrypts this message and, in step 1350, changes Node B's session key to the new Node B session key. In step 1352, Node B generates a response message confirming the use of the new keys. This message, in step 1354, is encrypted with the new Node A public key and new Node A session key and transmitted to Node A. In step 1356, Node A decrypts this message and, as indicated by box 1358, the strobe is complete.

The process continues in FIG. 13B at steps 1360 and 1362. In these steps a check is done to determine if there are two monitor nodes. If not, Node A, in step 1364, unblocks transmissions. Node B also unblocks transmissions, in step 1368. In step 1370, Node B saves the new Node B public, private and session keys and Node A public and session keys in a "stage one" file. Node B, in step 1372, generates a "saving keys" message, which it encrypts with the new keys, in step 1374, and transmits the message to Node A. Node A, in step 1376, decrypts this message, and, in step 1378, saves the new Node A public, private and sessions keys and the new Node B public and session keys in a "stage one" file. Node A, in step 1380, generates a message indicating the keys have been saved. This message is encrypted with the new keys and transmitted to Node B, in step 1382. In step 1384, Node B decrypts the message and, in step 1386, Node B saves the previous Node B private, public and session keys and previous Node A public and session keys in a "stage two" file. In step 1388, Node B generates a message indicating that it has "saved keys" and encrypts this message in step 1390 and transmits it to Node A. In step 1392, Node A decrypts the message, and saves the previous Node A private, public and session keys and previous Node B public and session keys in a "stage two" file.

At this point, the strobing with persistence is complete and the process continues to step 828 of FIG. 8. If a node goes down, while strobing is in progress, recovery becomes an issue. When the node that went down comes back up, it attempts to connect using the latest set of keys, that is, the "stage one" keys. If this connect fails, the node attempts to reestablish connection using the previous keys, that is, the "stage two" keys. As a result, strobing with persistence makes the network robust with respect to such situations.

If two monitors are installed the process continues from steps 1360 and 1362 to steps 1363 and 1365, wherein each node sends the public keys it is using with the other nodes (i.e., Monitor Node A, Node A, and Node B) to Monitor Node B. Also, referring to FIG. 18, monitor A (from FIG. 12) sends its corresponding group of keys. Monitor B compares the keys, step 1826, and determines if all public keys are consistently reported, step 1878. If not, a security violation is declared (i.e., an interposed node is detected) in step 1838. Else the process returns to steps 1244, 1364 and 1368 for Monitor A, Node A and Node B, respectively.

The system and installation processes described in FIGS. 6 through 13C are applicable to a wide variety of situations and environments wherein network and data security is desired, and possibly, paramount, such as in military, business, legal, or financial services environments. As one example, FIGS. 14 through 16F demonstrate how the present invention may be embodied in the context of a financial services environment, wherein a bank (which may be referred to as an "originator") has a software product (or application) which is capable of performing custody and accounting services for clients and investors, such services being typical in the financial services industry. The bank seeks to sell its services to clients (e.g., other financial service entities or parties), to do so involves distributing and configuring the bank's software application as part of a private secure network that includes the bank and its clients. Typically, a sales department (SD) of the bank negotiates the sale of a private secure network of application nodes, the production "network", with a procurement or purchasing group from the client. Preferably the network is also auditable.

Once the bank sales department and client purchasing department have reached agreement on the procurement of a private secure network, the definition of that network is reflected in a order form template (similar to template 610 of FIG. 7). FIG. 14A depicts a block diagram of a "functional network", referred to as "bank_one network" 1400, represented in template 1450 of FIG. 14B. Functional network 1400 is a representation of the network required to accomplish the functional goals of the client and is substantially similar to the "production" network 1600 (see FIG. 16A), except that the production network also includes monitor node 674. Functional network 1400 is divided into two sub-networks, that is, a bank sub-network 1410 (in this case, located in Boston, Mass., USA), and a client sub-network 1420 (in this case, located in London, Great Britain). In this simplified example, bank sub-network 1410 includes a bank mainframe computer system 1418 which performs centralized processing and control of the applications and their corresponding data, a sub-network monitor node, Node 1 1412, and two application nodes, Node 2 1414 and Node 3 1416. Client sub-network 1420 includes a client investment trading system 1428 which performs investment transactions, a monitor node, Node 4 1422, and two application nodes, Node 5 1424 and Node 6 1426. As will be appreciated by those skilled in the art, the bank may use an alternative forms of computing system, and need not use a mainframe system. Furthermore, network 1400 may involve a plurality of organizations and need not be limited to the bank and one client.

Template 1450 and functional network 1400 each show the links between nodes. In this embodiment, each sub-network monitor node is installed as an application node that may perform application or communication monitoring for its corresponding sub-network, or may optionally be omitted, since neither is the monitor node 674 used for installation, security monitoring, and key strobing of the production network. Therefore, the monitor node of each sub-network need not be linked to the monitor node of the other sub-network. However, nodes of different sub-networks should be linked, such as Node 3 in bank sub-network 1410 and Node 5 in client sub-network 1420, to establish communication between the sub-networks.

Figure 15:
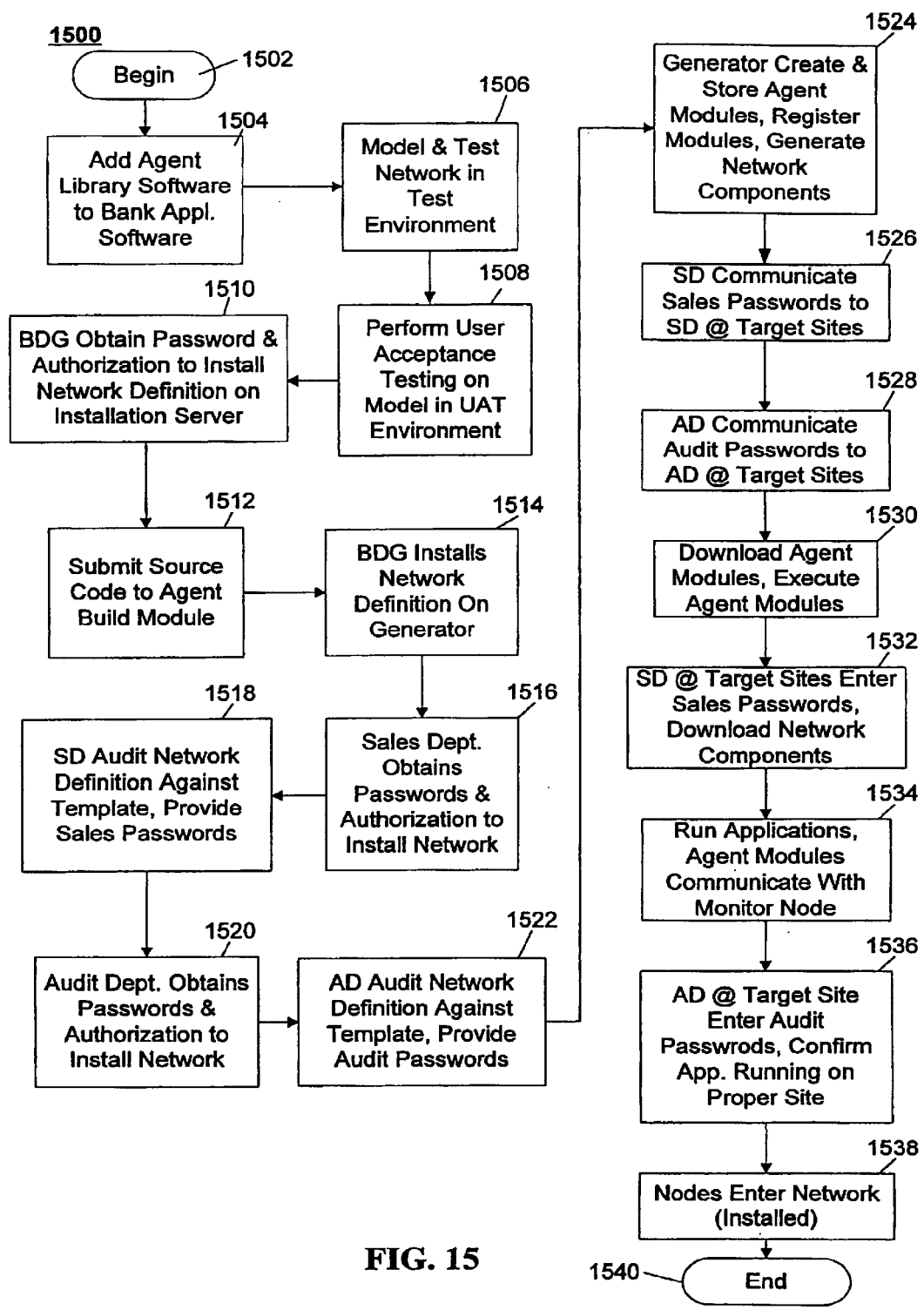
FIG. 15 is a method flow chart of the process for generating and installing the network described in FIG. 14A and 14B.

Once template 1450 is completed, the generation and installation of the private secure network may be accomplished using process 1500 of FIG. 15. System 600 of FIG. 6 is used to accomplish the generation and installation of production network 1600. Accordingly, production network 1600 (or the "network") of FIG. 16A employs end-to-end encryption of data, with passwords and encryption keys being strobed every few seconds under the control of monitor node 674. The passwords are hidden, that is, not stored in human readable form. There is limited and controlled data transfer, since the network is generated from a specific definition of nodes and links. Generation, installation, and operation of the network is accomplished, preferably, using formal audit procedures to mitigate the risk of corruption of the network and data.

In FIG. 15, the process is begun in step 1502 and in step 1504 a core set of agent module library software is added to the bank's application software. The library functionality enables communication among the installation system and nodes. Therefore, the library is required to create and operate the final production network 1600 shown in FIG. 16A. In this embodiment, in step 1506, the bank's development group (BDG) models the network using template 1450 and tests the network in a test (i.e., mock) environment 1610, shown in FIG. 16B, including a test bank mainframe 1418T and a test client trading system 1428T, which model bank mainframe 1418 and client trading system 1428. The network test model 1610 includes a modeled bank sub-network 1410T and client sub-network 1420T.

Figure 16A:
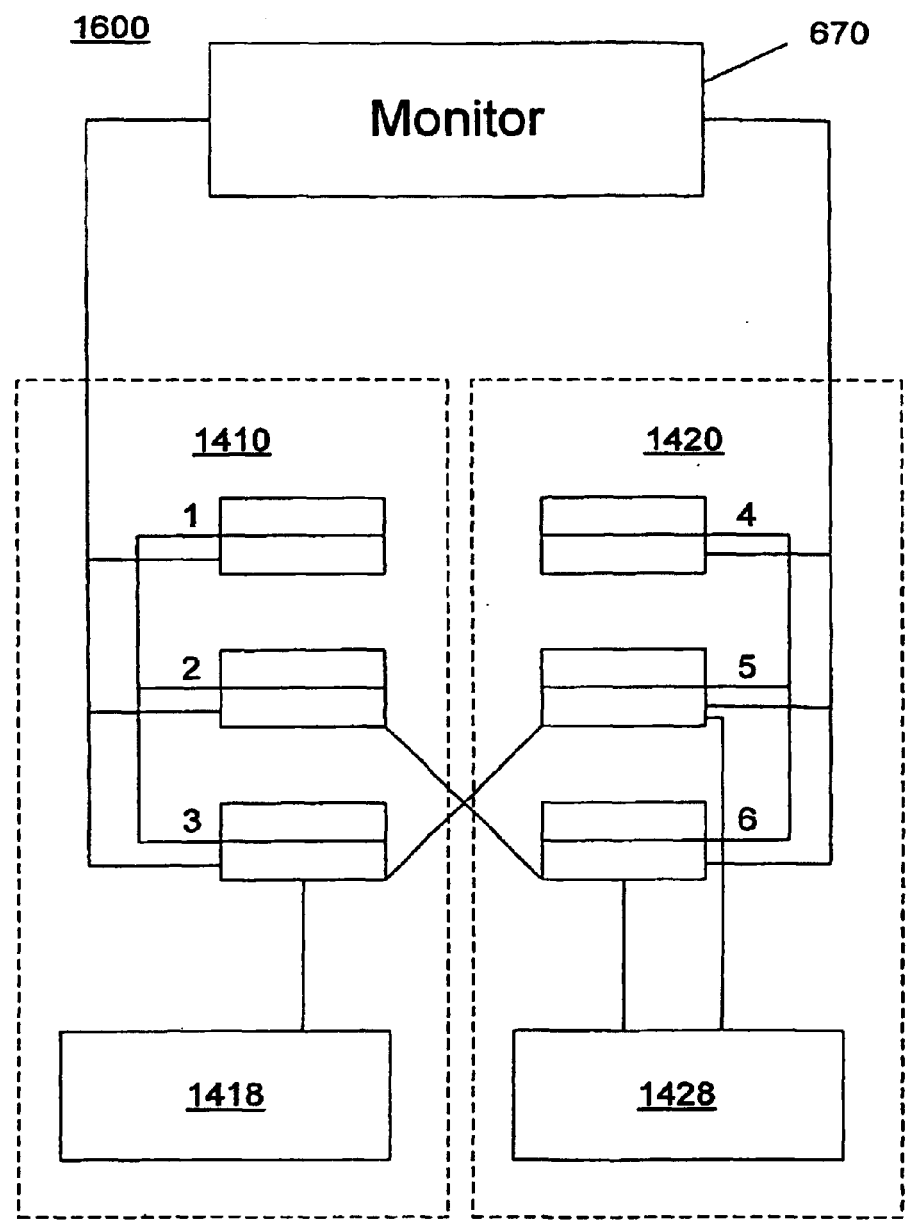
FIGS. 16A–F are block diagrams functionally depicting the method steps of FIG. 15.
Figure 16B:
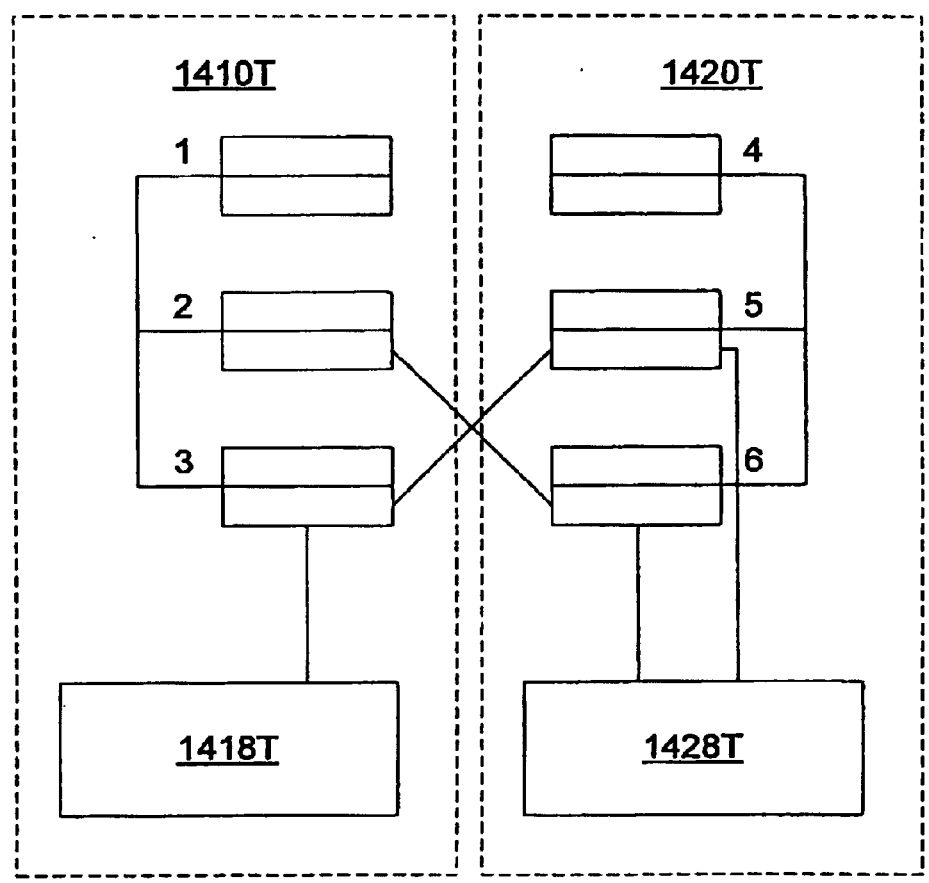
Figure 16C:
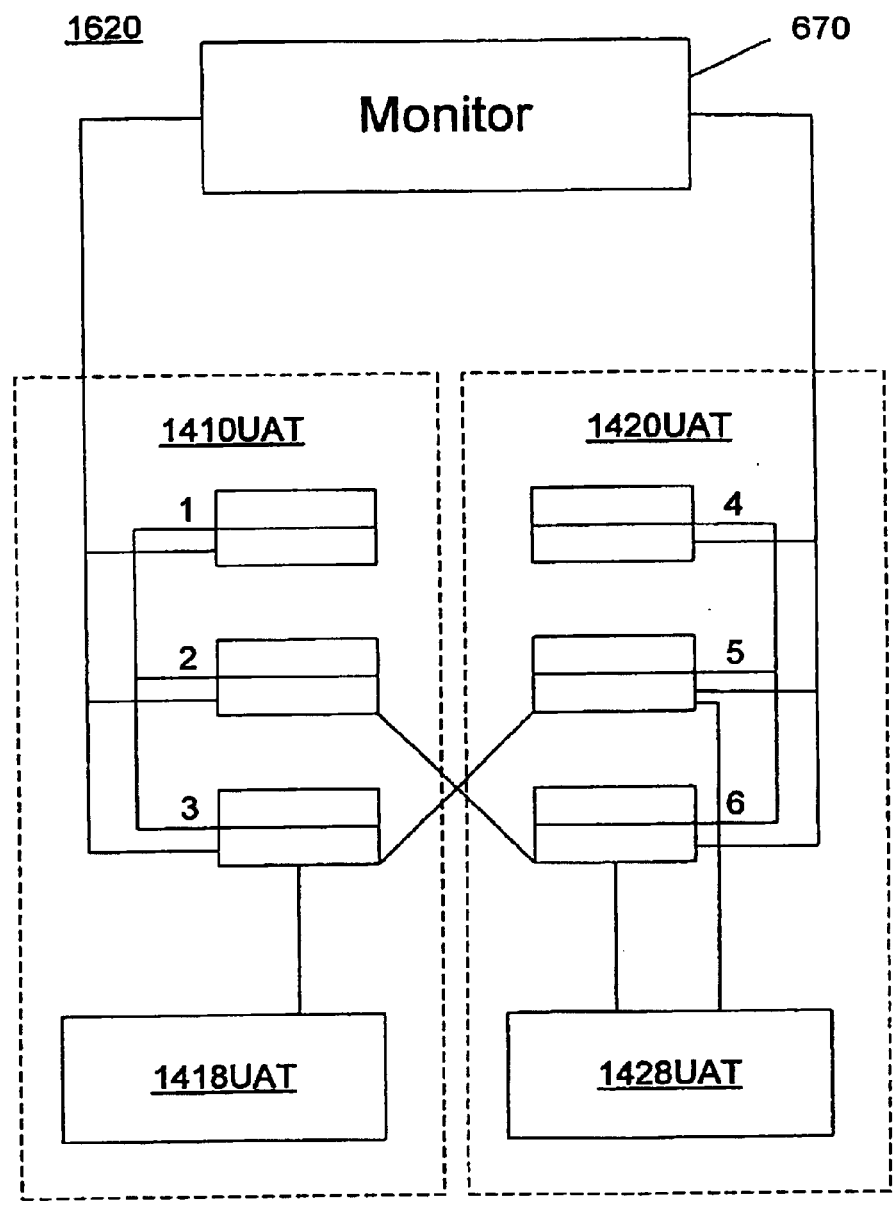
Figure 16D:
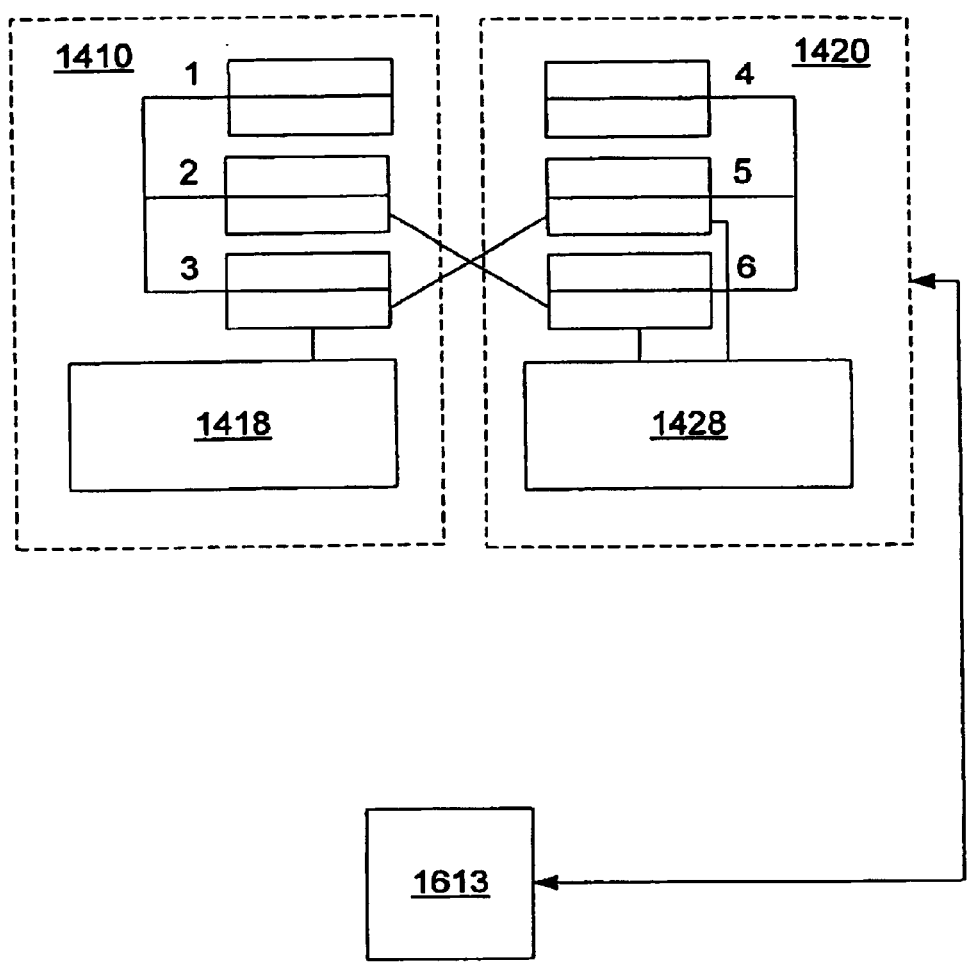

Upon successful completion of step 1506, the process proceeds to step 1508, wherein the network is modeled in a user acceptance test (UAT) environment 1620, shown in FIG. 16C, which closely resembles "production" network 1600. The UAT includes a UAT bank mainframe 1418UAT and a UAT client trading system 1428UAT, which model bank mainframe 1418 and client trading system 1428. The UAT network model 1620 includes a modeled bank sub-network 1410UAT and client sub-network 1420UAT. Upon successful completion of the UAT, the BDG obtains, from a bank network administration group, a series of local BDG passwords and authorization to install the network on installation server 630, in step 1510. The BDG then submits the network definition source code, embodying the network definition derived from template 1450, to an agent build module 1630, as depicted in step 1512 and shown in FIG. 16D. Agent build module 1630 includes software code that checks the source code for hidden "trap doors" (i.e., entry points) and builds the production code, such code analysis and generation functionality being generally known in the software development arts.

Figure 16E:
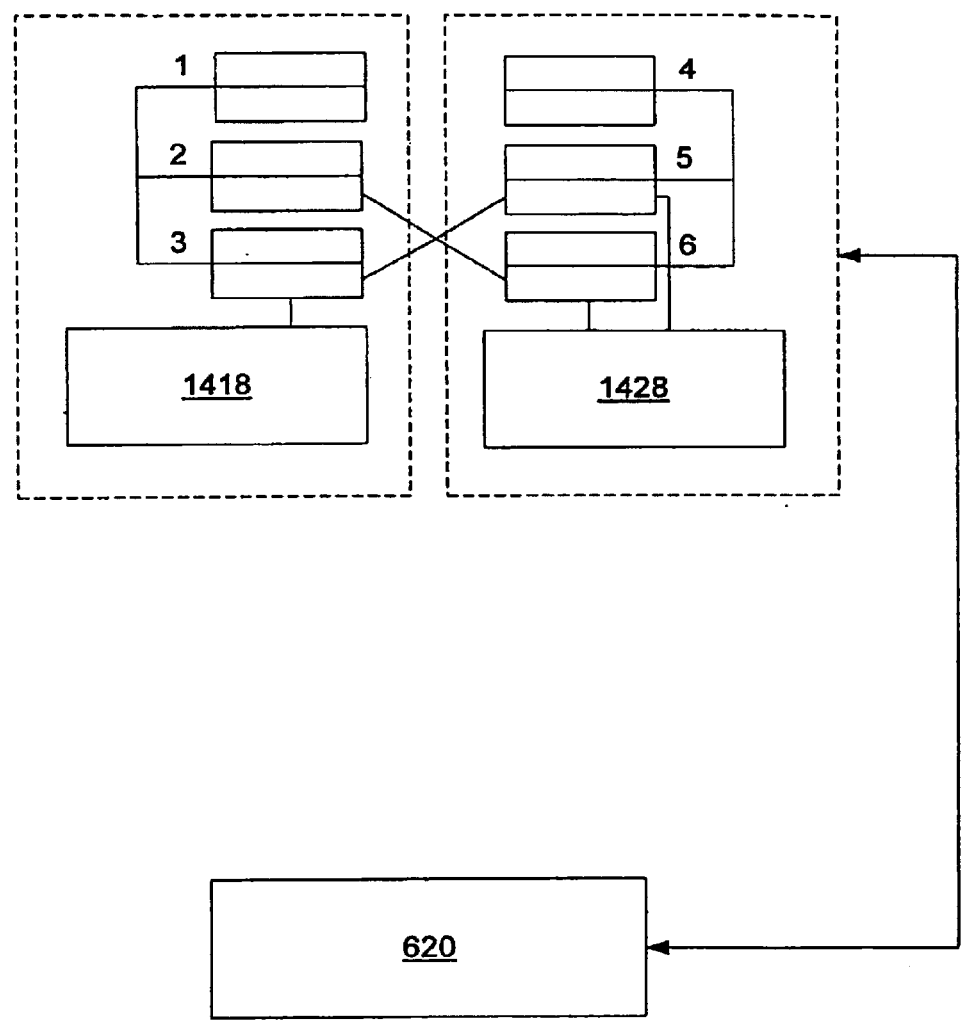

In step 1514, the BDG installs the network definition source code on generator 620, as shown in FIG. 16E. Generator 620 extensively tests the network configuration for accuracy and completeness. The bank sales department obtains, from the bank network administration group, local sales passwords and authorization to install the network, in step 1516. The sales department, using template 1450, audits the network configuration, which is rendered by generator 620 on a generator display (not shown), in step 1518. Therefore, any "phantom" nodes or connection may be easily detected and removed. The bank's sales department also provides the sales passwords to the generator in this step. Generator 620 checks that all required confirmations required by the sales department are made, and the process continues. In step 1520, the bank's audit department (AD) obtains audit passwords and authorization to install the network from the bank network administration group. As with the sales department, the audit department audits the network configuration rendered by generator 620 against template 1450, in step 1522. The local audit department also provides the audit passwords to the generator in this step. Generator 620 checks that all required confirmations required by the audit department are made.

At this point in process 1500, generator 620 is enabled to and does create the agent modules, node configuration files, and network information files, as indicated by step 1524. In this step, generator 620 also registers the agent modules with installation server 620 and stores the agent modules in memory or moves them to a bank web server 1640. This configuration is substantially similar to that of storage device 635 and web server 615 of FIG. 6. A more detailed discussion of step 1524 is provided with respect to the processes of FIGS. 8 and 9. As before, each agent module is configured to connect with installation server 630 and install a predetermined software application on a predetermined target site. Agent modules may only be installed once and, preferably, the software stays installed only if properly audited. That is, an installation period or time limit may be included in the code of the installation server, wherein failure to install the network prior to elapse of the period, as measured from the begin of component generation by generator 620, causes the installation to terminate and installed software to be uninstalled automatically.

Figure 16F:
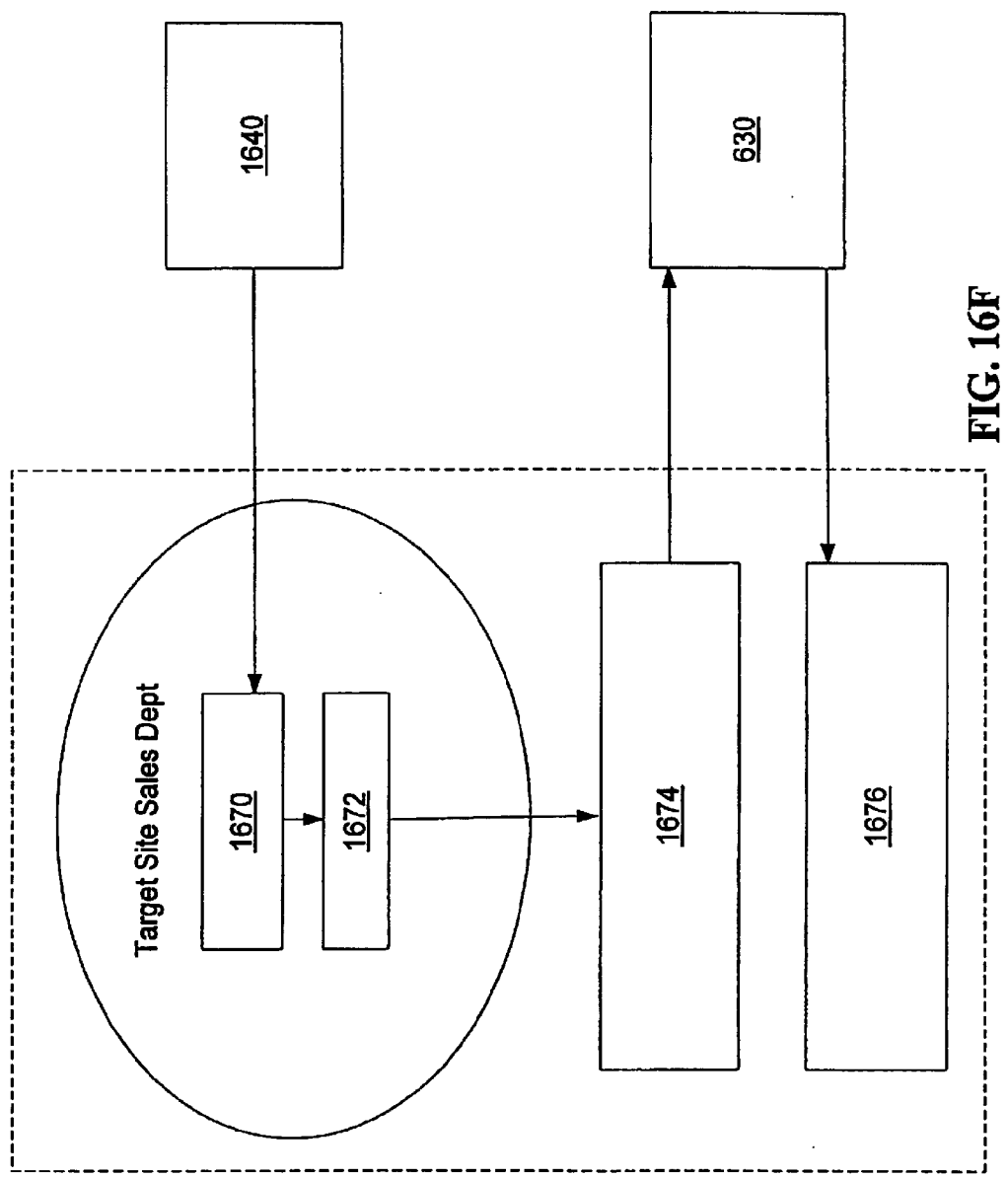

To facilitate installation at the target sites, the bank's sales department communicates the sales passwords to the bank's sales department staff at bank target sites and to client purchasing department staff at client target sites, as shown in step 1526. Similarly, in step 1528, the bank's audit department communicates the audit passwords to the bank's audit department staff at bank target sites and to client audit department staff at client target sites. At each target site, the corresponding agent module is downloaded from web server 1640 by the sales department staff at that target site, in step 1530, and executes the downloaded agent module, as shown in FIG. 16F. The agent module prompts the sales staff to input the local sales password and upon input and verification of the sales password, the agent module downloads the application and network components for that target site, in step 1532.

In step 1534, the sales staff runs the application on the target site and the application, using the network components, establishes communication with monitor node 674. To verify that the application is running on the proper target site, the monitor node requests the input of the audit password for that node. In step 1536, the audit department staff at the target site inputs the audit password. Upon verification by monitor node 674 of the audit password, the node is allowed by monitor node 674 to enter the network. The audit department staff at each target site may also communicate directly with bank audit department staff to personally confirm that the applications are running on the proper target sites. The details of the process for entering the network are described with respect to the process of FIGS. 10A through 10C. Preferably, key strobing and auditing are performed on the production network once installation is complete, as previously described.

In the description of the present invention, the use of dual key cryptography as defined by the RSA algorithm has been used for illustrative purposes. If another algorithm were to be used or invented, the present invention could be modified to use that algorithm using the principles set forth in this invention. The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for generating, installing to a plurality of linked remote computers, and monitoring a secure network of nodes, said system comprising:
   A. at least one software application;
   B. an installation server, configured to facilitate installation of said at least one software application;
   C. a generator, configured to generate a plurality of software components from a network definition, including a plurality of agent modules, wherein each agent module is executable on a corresponding remote computer to initiate communication with said installation server and subsequent installation of a corresponding software application on said remote computer to form a node, wherein each of said nodes is capable of automatically establishing communication with others of said nodes according to said network definition;
   D. a monitor node configured to monitor security of said network; and
   E. wherein said network definition includes a plurality of node definitions, each node definition including:
      (i) an identification of one of said plurality of remote computers;
      (ii) an identification of at least one software application to be installed on said remote computer to form a node; and
      (iii) an identification of each other node to which said node is to be linked.

2. A system according to claim 1, wherein the remote computers are linked substantially by the Internet.

3. A system according to claim 1, wherein the remote computers are linked substantially by an intranet.

4. A system according to claim 1, wherein said identification of each of said plurality remote computers includes:
   C. (i) (a) an IP address; and
      (b) a node name.

5. A system according to claim 1, wherein said plurality of software components further includes:
   C. (i) a plurality of node configuration files, wherein a different one of said node configuration files corresponds to a different node and includes information for facilitating selective communication with others of said nodes according to said network definition; and
      (ii) at least one network information file, having information corresponding to substantially all links between nodes and accessible by said monitor node to facilitate the selective linking of said nodes.

6. A system according to claim 1, wherein said installation server is configured to facilitate said installation of said corresponding software application as a function of a verification that said agent module is executing on said corresponding remote computer, according to said network definition.

7. A system according to claim 1, wherein said installation server is configured to facilitate said installation of said corresponding software application as a function of a verification that said agent module has not been previously installed.

8. A system according to claim 1, further including a second monitor node configured to determine the presence of an interposed, unintended node.

9. A system according to claim 1, wherein said monitor node is further configured to selectively terminate operation and connection of one or more tainted nodes in response to a detected security violation.

10. A system according to claim 9, wherein said installation server is further configured to initiate a regeneration of a set of said software components, reinstallation of said at least one software application, and selective relinking to other nodes for each of said selectively terminated one or more tainted nodes and according to said network definition.

11. A system according to claim 1, wherein said monitor node and each of said nodes communicate using secure data transfer.

12. A system according to claim 11, wherein said secure data transfer is accomplished using data encryption, and wherein data transferred in each direction between two linked nodes is encrypted differently.

13. A system according to claim 12, wherein each of two linked nodes uses a unique pair of encryption keys to accomplish said data encryption, and each pair of encryption keys includes a substantially hidden private key and a public key.

14. A system according to claim 13, wherein said monitor node is further configured to selectively initiate a coordinated strobing of each pair encryption keys between two linked nodes.

15. A system according to claim 1, further including:
   E. an account server, configured to generate billing information as a function of the selective linking of said node to said other nodes.

16. A system according to claim 1, wherein said installation server is configured to communicate with each of said plurality of remote computers using data encryption.

17. A system according to claim 16, wherein said installation uses a randomly generated private key and public key pair for data encryption, wherein data to be transferred to said installation server is encrypted using said public key and is decrypted by said installation server using said private key.

18. A system according to claim 17, further including:
   E. a second monitor node, configured to compare the installation server public key with the encryption key used by one of said plurality of remote computers to encrypt data sent to said installation server, a negative comparison being indicative of a security violation.

19. A system for generating, installing to a plurality of linked remote computers, and monitoring a secure network of nodes, said system comprising:
   A. at least one software application;
   B. an installation server, configured to facilitate installation of said at least one software application;
   C. a generator, configured to generate a plurality of software components from a network definition, including a plurality of agent modules, wherein each agent module is executable on a corresponding remote computer to initiate communication with said installation server and subsequent installation of a corresponding software application on said remote computer to form a node, wherein each of said nodes is capable of automatically establishing communications with others of said nodes according to said network definition;
   D. a monitor node configured to monitor security of said network, wherein said monitor node and each of said nodes communicate using secure data transfer; and
   E. wherein said network definition includes a plurality of node definitions, each node definition including:
      (i) an identification of one of said plurality of remote computers;
      (ii) an identification of at least one software application to be installed on said remote computer to form a node; and
      (iii) an identification of each other node to which said node is to be linked.

20. A system according to claim 19, wherein said secure data transfer is data encryption and each of two linked nodes uses a unique set of encryption keys to accomplish said data encryption.

21. A system according to claim 20, wherein said encryption keys are substantially randomly generated.

22. A system according to claim 20, wherein each set of said encryption keys includes a hidden private key and a public key, and said public key is used by a first node in a link to encrypt data transmitted to a second node in the link, and said private key is used to decrypt said data by said second node.

23. A system according to claim 20, wherein said monitor node is further configured to selectively initiate a coordinated strobing of each set of encryption keys between two linked nodes.

24. A system according to claim 20, wherein said monitor node is further configured to effectuate persistence of said encryption keys, and wherein when a first set of encryption keys used by two linked nodes is strobed, a second set of encryption keys is randomly generated, and said first and said second sets are stored in a memory, such that when one or both of said two linked nodes loses its connection with the other of said two linked nodes, said two linked nodes attempt to reestablish said connection alternatively using said first and said second set of encryption keys.

25. A system according to claim 20, wherein said installation server is configured to communicate with each of said plurality of remote computers using data encryption.

26. A system according to claim 25, wherein said installation uses a randomly generated private key and public key pair for data encryption, wherein data to be transferred to said installation server is encrypted using said public key and is decrypted by said installation server using said private key.

27. A system according to claim 26, further including:
   E. a second monitor node, configured to compare the installation server public key with the encryption key used by one of said plurality of remote computers to encrypt data sent to said installation server, a negative comparison being indicative of a security violation.

28. A system for generating, installing to a plurality of linked remote computers, and monitoring an auditible secure network of nodes, said system comprising an secure network:
   A. at least one software application;
   B. an installation server, configured to facilitate installation of said at least one software application;
   C. a generator, configured to generate a plurality of software components from a network definition, including a plurality of agent modules, wherein each agent module is executable on a predetermined corresponding remote computer to initiate communication with said installation server and subsequent installation of a predetermined corresponding software application on said remote computer to form a node, wherein each of said nodes is capable of automatically establishing communication with others of said nodes according to said network definition, and wherein said subsequent installation is contingent upon a first verification that said agent module is installed on its corresponding remote computer and wherein said installation is further contingent upon a second verification that said software application is installed on its predetermined corresponding remote computer;
   D. a monitor node configured to monitor security of said network; and
   E. wherein said network definition includes a plurality of node definitions, each node definition including:
      (i) an identification of one of said plurality of remote computers;
      (ii) an identification of at least one software application to be installed on said remote computer to form a node; and
      (iii) an identification of each other node to which said node is to be linked.

29. A system according to claim 28, wherein said installation server is configured to terminate said installation of said at least one software application on said corresponding remote computer if said agent module has been previously installed.

30. A system according to claim 28, wherein said installation server is configured to terminate said installation of said at least one software application on said corresponding remote computer if said agent module is not installed on said corresponding computer.

31. A system according to claim 28 wherein said installation server is configured to perform said subsequent installation in response to receipt of a password entered at said remote computer, as said first verification.

32. A system according to claim 28, wherein said installation server is configured to complete said installation in response to receipt of a password entered at said remote computer, as said second verification.

33. A system according to claim 28, further including:
   E. a software component analyzer, configured to analyze said software components and determine the presence of trap doors.

34. A system according to claim 28, wherein said installation server is configured to communicate with each of said plurality of remote computers using data encryption.

35. A system according to claim 34, wherein said installation uses a randomly generated private key and public key pair for data encryption, wherein data to be transferred to said installation server is encrypted using said public key and is decrypted by said installation server using said private key.

36. A system according to claim 35, further including:
E. a second monitor node, configured to compare the installation server public key with the encryption key used by one of said plurality of remote computers to encrypt data sent to said installation server, a negative comparison being indicative of a security violation.

37. A method for generating, installing to a plurality of remote computers, and monitoring a secure network having a plurality of nodes, a generator, an installation server, and a monitor node, the method comprising the steps:
A. creating a network definition, including information that describes each remote computer, at least one software application to be installed on each remote computer, and each link between nodes;
B. generating with said generator a plurality of software components, as a function of said network definition, including a plurality of agent modules, wherein each agent module is executable on a preselected one of said remote computers and includes functionality to communicate with said installation server;
C. executing an agent module on its corresponding remote computer, wherein said agent module automatically establishes communication with said installation server;
D. downloading, using said installation server, to said remote computer a corresponding at least one software application;
E. executing said at least one software application on said remote computer to form a node and automatically establishing a connection with said monitor node;
F. selectively linking said node to others of said plurality of nodes according to said network definition; and
G. repeating steps C through F for each agent module and corresponding remote computer.

38. The method of claim 37, wherein step A includes identifying each remote computer by an IP address and a node name.

39. The method of claim 37, wherein step B further includes generating:
(i) a plurality of node configuration files, wherein each node configuration file corresponds to one of said nodes; and
(ii) a set of network information files, including information corresponding to a plurality of links required to form said network.

40. The method of claim 37 wherein step D further includes verifying that said agent module is executing on a corresponding remote computer, according to said network definition, as a prerequisite to downloading said at least one software application.

41. The method of claim 40 wherein step B includes generating a unique local password for each node and said verifying in step D includes:
(i) entering said local password at said remote computer; and
(ii) verifying said local password at said installation server.

42. The method of claim 37 wherein step D further includes verifying that said agent module has not been previously installed, as a prerequisite to downloading said at least one software application.

43. The method of claim 37 wherein step F further includes verifying that said software application is executing on its corresponding remote computer according to said network definition, as a prerequisite of selectively linking said node to others of said plurality of nodes.

44. The method of claim 43 wherein step B includes generating a unique audit password for each node and said verification in step F includes:
(i) entering said audit password at said remote computer; and
(ii) verifying said audit password.

45. The method of claim 37, further including a step:
H. terminating operation and connection of one or more tainted nodes, under control of said monitor node, in response to detection of a security violation related to said tainted node.

46. The method of claim 45, further including a step:
I. repeating steps B–G for each of said one or more tainted nodes.

47. The method of claim 37, wherein step B further includes generating for each node in a pair of linked nodes, a set of encryption keys, including a private key and a public key, to facilitate secure communication between said linked nodes.

48. The method of claim 47, further including step:
H. (i) selecting said pair of linked nodes; and
(ii) strobing each set of encryption keys for said linked nodes.

49. The method of claim 48, wherein said two linked nodes are a first node and a second node and said strobing includes the steps:
(a) ceasing data transfer between said first and second nodes;
(b) randomly generating a new first private key for said first node;
(c) deriving a new first public key from said new first private key and storing said new first private and public keys;
(d) encrypting said new first public key with a current second public key of said second node and transmitting said new first public key to said second node;
(e) decrypting with a current second private key said new first public key and storing said new first public key at said second node and randomly generating a new second private key;
(f) deriving a new second public key from said new second private key and storing said new second private and public keys;
(h) encrypting said new second public key with a current first public key of said first node and transmitting said new second public key to said first node;
(i) decrypting with a current first private key said new second public key and storing said new second public key at said first node;
(j) exchanging confirmations between said first and second nodes to use said new first and second private and public keys; and
(k) resuming data transfer between said two linked nodes.

50. The method of claim 49, wherein each pair of linked nodes also uses at least one session key to encrypt data transferred between said linked nodes and said strobing further includes:
randomly generating, exchanging and storing at least one new session key for said linked nodes, between steps H(ii)(a) and H(ii)(k).

51. The method of claim 49 wherein said strobing is strobing with persistence and said step H(ii) further includes saving said current first and second public and private keys.

52. The method of claim 37, wherein said network further includes an account server, said method further comprising the step of:
- H. (i) communicating to said account server said linking of said node, in step F; and
  - (ii) generating billing information related to said linking of said node.

53. The method of claim 37, wherein step B includes generating a unique set of encryption keys for each node and said monitor node.

54. The method of claim 53, wherein step E includes the steps of:
- (i) logging into said monitor node by said node using a unique encryption key from a corresponding set of node encryption keys generated by said generator; and
- (ii) logging into said node using a unique monitor node encryption key from a corresponding set of monitor node encryption keys generated by said generator.

55. The method of claim 37, wherein said secure network further includes a second monitor node and said installation server communicates with each of said plurality of remote computers using a private and public encryption key pair, the method further including the step of:
- H. (i) comparing the public key of said installation server with a key used by one of said plurality of remote computers to encrypt data sent to said installation server; and
  - (ii) issuing a security violation message, in the event of a negative comparison.

56. A method for generating, installing to a plurality of remote computers, and monitoring a secure network having a plurality of nodes, a generator, an installation server, and a monitor node, said network used for conducting financially related transactions between a custody system of a bank and a trading system of a financial client, the method comprising the steps of:
- A. creating, by a bank sales department, a network definition embodying the network required by the financial client and to be generated, installed and monitored by the bank; wherein said network definition includes a plurality of node definitions, each node definition including:
  - (i) an identification of one of said plurality of remote computers;
  - (ii) an identification of at least one software application to be installed on said remote computer to form a node; and
  - (iii) an identification of each other node to which said node is to be linked.
- B. modeling and testing said network definition, by a bank development group;
- C. obtaining authorization from a bank network administration group and installing said network definition on said generator, by said bank development group;
- D. obtaining by said bank sales group a sales password and authorization to install network from said network administration group;
- E. auditing on said generator a generated network definition by comparing said generated network definition to said network definition and inputting said sales password as an indication of a favorable comparison, by said bank sales group;
- F. obtaining by a bank audit group, an audit password and authorization to install network from said network administration group;
- G. auditing on said generator a generated network definition by comparing said generated network definition to said network definition and inputting said audit password as an indication of a favorable comparison, by said bank audit group;
- H. generating with said generator a plurality of software components to be installed on said plurality of remote computers to form said plurality of nodes of said network, said components including:
  - (i) a plurality of agent modules, each agent module having the capability to establish communications with said installation server;
  - (ii) a local sales password, for each agent module;
  - (iii) a local audit password for each agent module;
- I. registering said agent modules with said installation server, wherein said installation server has access to at least one or more bank custody software applications to be stored on each of said plurality of remote computers to form said nodes, according to said network definition;
- J. communicating to each remote computer a corresponding one of said local sales passwords to a sales department representative;
- K. communicating to each remote computer a corresponding one of said local audit passwords to an audit department representative;
- L. executing each agent module on its corresponding remote computer, entering said local sales password to verify that said agent module is installed on its corresponding remote computer according to said network definition, and downloading said corresponding at least one bank custody software application;
- M. executing each of said at least one software applications on its corresponding remote computer, establishing communication with said monitor node, entering said local audit password to verify that said at least one software application is installed on its corresponding remote computer according to said network definition; and
- N. selectively linking said nodes into said network.

57. A method for generating, installing to a plurality of remote computers, and monitoring a secure network having a plurality of nodes, a generator, an installation server, and a monitor node, wherein the secure network is used for the exchange of confidential data between a first system of a first group and a second system of a second group, the method comprising the steps:
- A. creating a network definition, including information that describes each remote computer, at least one first group software application to be installed on each remote computer, and each link between nodes;
- B. generating with said generator a plurality of software components, as a function of said network definition, including a plurality of agent modules, wherein each agent module is executable on a preselected one of said remote computers and includes functionality to communicate with said installation server;
- C. executing an agent module on its corresponding remote computer, wherein said agent module automatically establishes communication with said installation server;
- D. (i) human auditing and verifying that said agent module is installed on its corresponding remote computer according to said network definition by a third group; and (ii) downloading, using said installation server, to said remote computer a corresponding at least one first group software application;

E. (i) executing said at least one first group software application on said remote computer to form a node and automatically establishing a connection with said monitor node; and (ii) human auditing and verifying that said at least one first group software application is installed on its corresponding remote computer according to said network definition by a fourth group, independent from said third group;

F. communicating with others of said plurality of nodes according to said network definition; and G. repeating steps C through F for each agent module and corresponding remote computer.

58. The method of claim 57 wherein said confidential data is financial data and said first system of said first group is a custody system of a bank and said second system of said second group is a trading system of a financial services group.

* * * * *